United States Patent
Ishikawa

(10) Patent No.: US 12,013,679 B2
(45) Date of Patent: Jun. 18, 2024

(54) ABNORMALITY DETECTION SYSTEM, ABNORMALITY DETECTION APPARATUS, AND ABNORMALITY DETECTION METHOD

(71) Applicant: RENESAS ELECTRONICS CORPORATION, Tokyo (JP)

(72) Inventor: Shinji Ishikawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 1099 days.

(21) Appl. No.: 16/850,806

(22) Filed: Apr. 16, 2020

(65) Prior Publication Data

US 2020/0393812 A1  Dec. 17, 2020

(30) Foreign Application Priority Data

Jun. 14, 2019 (JP) .................................. 2019-111283

(51) Int. Cl.
*G05B 19/406* (2006.01)
*G06F 17/18* (2006.01)

(52) U.S. Cl.
CPC ........... *G05B 19/406* (2013.01); *G06F 17/18* (2013.01); *G05B 2219/34465* (2013.01)

(58) Field of Classification Search
CPC ........ G05B 19/406; G05B 2219/34465; G06F 17/18
See application file for complete search history.

(56) References Cited

U.S. PATENT DOCUMENTS 10,409,260 B2   9/2019  Kawatake
2018/0292806 A1* 10/2018  Kawatake ........ G05B 19/41875
(Continued)

FOREIGN PATENT DOCUMENTS

| JP | 2009-157787 A | 7/2009 |
| JP | 2010-198227 A | 9/2010 |
| JP | 2018-180705 A | 11/2018 |

OTHER PUBLICATIONS

Sakurai et al., "Stream Monitoring under the Time Warping Distance," 2007 IEEE 23rd International Conference on Data Engineering, Istanbul, Turkey, 2007, pp. 1046-1055 (Year: 2007).*

(Continued)

*Primary Examiner* — Miranda M Huang
*Assistant Examiner* — Yao David Huang
(74) *Attorney, Agent, or Firm* — Rimon P.C.

(57) ABSTRACT

It is an object of the present invention to provide a technique capable of easily extracting a section signal of a specific sub-process. The anomaly detection system includes an extraction unit for extracting a specific subsequence to be an object of anomaly detection from among a plurality of subsequences from a composite sequence included in a monitor signal. The extraction unit determines an optimal warping path from the composite sequence and a reference sequence, which is an example of the composite sequence acquired in advance, by a dynamic time warping method. The extraction unit identifies a start point and an end point of a specific subsequence based on the optimal warping path and the start point and end point of the subsequence of the reference sequence. The extraction unit extracts a specific subsequence based on a start point and an end point of the specific subsequence.

11 Claims, 23 Drawing Sheets

(56) References Cited

U.S. PATENT DOCUMENTS

2019/0198405 A1\* 6/2019 Li ................... G05B 19/41875
2020/0035001 A1\* 1/2020 Pang ..................... G06T 11/001

OTHER PUBLICATIONS

Keogh et al., "Scaling up Dynamic Time Warping for Datamining Applications," KDD 2000, Boston, MA USA (Year: 2000).\*
Müller, Meinard, "Dynamic Time Warping," in Information Retrieval for Music and Motion, chapter 4, Springer (2007). (Year: 2007).\*
Choi et al., "Process Start/End Event Detection and Dynamic Time Warping Algorithms for Run-by-Run Process Fault Detection," 2007 International Symposium on Semiconductor Manufacturing, Santa Clara, CA, 2007, pp. 1-4 (Year: 2007).\*
Rajshekhar et al., "Fault Diagnosis Using Dynamic Time Warping," A. Ghosh, R.K. De, and S.K. Pal (Eds.): PReMI 2007, LNCS 4815, pp. 57-66, 2007 (Year: 2007).\*
Japanese Notice of Reasons for Refusal issued in corresponding Japanese Patent Application No. 2019-111283, dated Sep. 28, 2022, with English translation.

\* cited by examiner

ABNORMALITY DETECTION SYSTEM, ABNORMALITY DETECTION APPARATUS, AND ABNORMALITY DETECTION METHOD

CROSS-REFERENCE TO RELATED APPLICATIONS

The disclosure of Japanese Patent Application No. 2019-111283 filed on Jun. 14, 2019 including the specification, drawings and abstract is incorporated herein by reference in its entirety.

BACKGROUND

The present disclosure relates to an anomaly detection system, and can be applied to an anomaly detection system including a function of detecting a detection target signal from a signal indicating a processing state of a manufacturing device, for example.

In recent years, along with the Fourth Industrial Revolution, in manufacturing systems, in order to improve manufacturing efficiencies, the utilization of arts such as AI (Artificial Intelligence) and IoT (Internet of Things) has been advancing. With such manufacturing systems, for example, the status of the processing of the manufacturing device can be monitored in real time by various sensors, and an anomaly in the manufacturing device can be detected at an early stage based on the monitoring results. When detecting the anomaly, for example, the anomaly of the detection target is detected based on detection algorithms registered in advance in the storage device.

For example, Japanese Unexamined Patent Application Publication No. 2018-180705 (Patent Document 1) shows an anomaly detection system capable of reducing the workload of a technician or the like. In the anomaly detection system, the target signal selection unit determines a detection target section, which is a section in which the manufacturing device is substantially operating, from the monitor signals received through the signal input unit, and extracts the signal of the section as a detection target signal. Here, the monitor signal is a signal indicating the state of the processing of the manufacturing device. Specifically, for example, when the monitor signal becomes 0V in the idle section, the target signal selection unit determines the detection target section as a section in which the voltage level of the monitor signal is 0.1V or more.

SUMMARY

However, even if, for example, the manufacturing device performs a temporally consecutive sequence of composite steps consisting of a plurality of sub-steps, the monitor signal is a signal sequence of a sequence of composite steps consisting of signals corresponding to the plurality of sub-steps. For this reason, it is difficult to set a condition for extracting a signal section of a specific sub-process. Other objects and novel features will become apparent from the description of the present disclosure and the accompanying drawings.

The typical aspects of the present disclosure will be briefly described below. That is, the anomaly detection system includes an extraction unit that extracts a specific subsequence to be an object of anomaly detection from among a plurality of subsequences from a composite sequence included in a monitor signal. The extraction unit determines an optimal warping path from the composite sequence and a reference sequence, which is an example of the composite sequence acquired in advance, by a dynamic time warping method. The extraction unit identifies a start point and an end point of a specific subsequence based on the optimal warping path and the start point and end point of the subsequence of the reference sequence acquired in advance. The extraction unit extracts a specific subsequence based on a start point and an end point of the specific subsequence.

According to the anomaly detection system, it is possible to easily extract a section signal of a specific sub-process.

DETAILED DESCRIPTION

Figure 1:
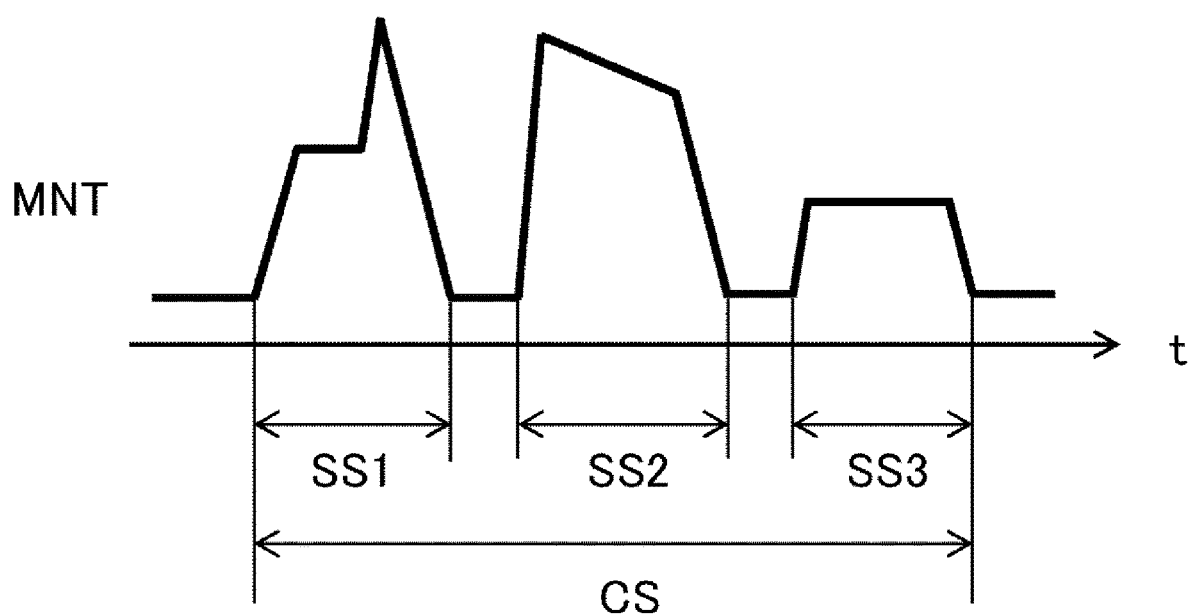
FIG. 1 is a diagram illustrating an example of monitor signal.

Embodiments, embodiment and modified example will be described below with reference to the drawings. However, in the following description, the same components are denoted by the same reference numerals, and a repetitive description thereof may be omitted.

First, the anomaly detection of the anomaly detection system will be outlined. Examples of the above-mentioned detection algorithm include an AI-based algorithm and an algorithm based on a statistical technique. In the AI-based algorithm, for example, a model of a neural network in which a feature of a detection target signal has been learned is used. The model receives, for example, a detection target signal, and reflects the learned feature on the detection target signal to generate an expected value signal, in other words, an ideal detection target signal. The anomaly detection unit of the anomaly detection system determines the presence or absence of anomaly of the detection target signal in accordance with whether or not the error between the detection target signal and the expected value signal is within an acceptable range. On the other hand, in the algorithm based on the statistical method, a normal distribution model or a multivariate analysis model that reflects various statistical values of the detection target signal is used. Using these models, the anomaly detection unit determines the presence or absence of anomaly of the detection target signal in accordance with whether or not the variation or the like of the detection target signal is within a range that can be determined to be statistically (theoretically) normal.

Next, the necessity of extracting a signal section of a specific sub-process will be described with reference to FIG. 1. FIG. 1 is a diagram illustrating an example of monitor signal.

As described above, the monitor signal (MNT) includes a series of time-series signals (hereinafter, for convenience, referred to as a composite sequence (CS)) comprising time-series signals (hereinafter, referred to as a subsequence (SS)) corresponding to a plurality of sub-processes. For example, as shown in FIG. 1, the composite sequence (CS) includes a subsequence (SS1) of a first sub-step, a subsequence (SS2) of a second sub-step, and a subsequence (SS3) of a third sub-step.

In the composite sequence (CS), the signal interval of other sub-processes may vary in time, or the voltage level of the monitor signal (MNT) may vary. Thus, for example, a subsequence (SS2) of another sub-step (second sub-step) may need to be characterized as higher than a subsequence (SS3) of a specific sub-step (third sub-step). In this instance, steady error values in the detection of anomalies in the subsequence (SS2) become high, and minute errors in the subsequence (SS3) of a specific sub-process cannot be detected. Therefore, by extracting only a signal section of a specific sub-process and detecting an anomaly, a minute error of the specific sub-process can be detected.

When a signal of an unnecessary section is included, the following problem also occurs. (1) The data point of the monitor signal, which is the signal subject to detection processing, increases. Alternatively, the learned features are increased to generate an expected value signal. This increases the size of the model of the anomaly detection algorithm, which in turn increases the computation time. This impairs the real-time nature of anomaly detection. (2) Anomaly error detection occurs due to an error with the expected value signal in an unnecessary section of the signal.

For this reason, in order to perform anomaly detection with high speed and high accuracy, it is necessary for the anomaly detection system to appropriately remove an unnecessary section from the monitor signal MNT.

On the other hand, in Patent Document 1, as described above, when the monitor signal becomes 0V in the idle section, the target signal selection unit determines the detection target section as a section in which the voltage level of the monitor signal is 0.1V or more. This is possible only when the "idle section" which is an unnecessary section and the "detection target section" which is suitable for detecting target signal can be clearly distinguished by the voltage level". Therefore, an unnecessary section cannot be appropriately removed from the monitor signal MNT.

Next, a description will be given of a technique which has been discussed by the present disclosing person prior to the present disclosure. The following functions were examined in identifying the detection target section. (1) The function of setting different voltage level conditions for the start condition and end condition of the detection target section. (2) A function of further setting the length of time that satisfies the condition of the voltage level as a condition. (3) A function of setting a condition of an average value or a maximum or minimum value for a signal sequence extracted as a detection target signal, and suspending transfer to an anomaly detection unit. (4) A function of absolutely specifying a detection target section by setting a condition to a "trigger signal" that separately indicates the detection target section.

However, some monitor signals (MNT) could not define the detection target section even with the functions (1) to (4) described above. The monitor signal MNT, which has become a problem, is a signal sequence of a series of processes comprising signals corresponding to a plurality of sub-processes described above, and it is difficult to set a condition for extracting a signal section of a specific sub-process.

In addition, although the semiconductor manufacturing device can output a trigger signal indicating a signal interval of a series of processes, the semiconductor manufacturing device may not output a trigger signal indicating a signal interval of a specific sub-process in some cases. The condition setting for defining the detection target section requires that a technician as a user closely observe the monitor signal MNT and, in some cases, and then define a plurality of conditions. This depends on the skill of the technician and can be a workload in operating the anomaly detection system.

Figure 2:
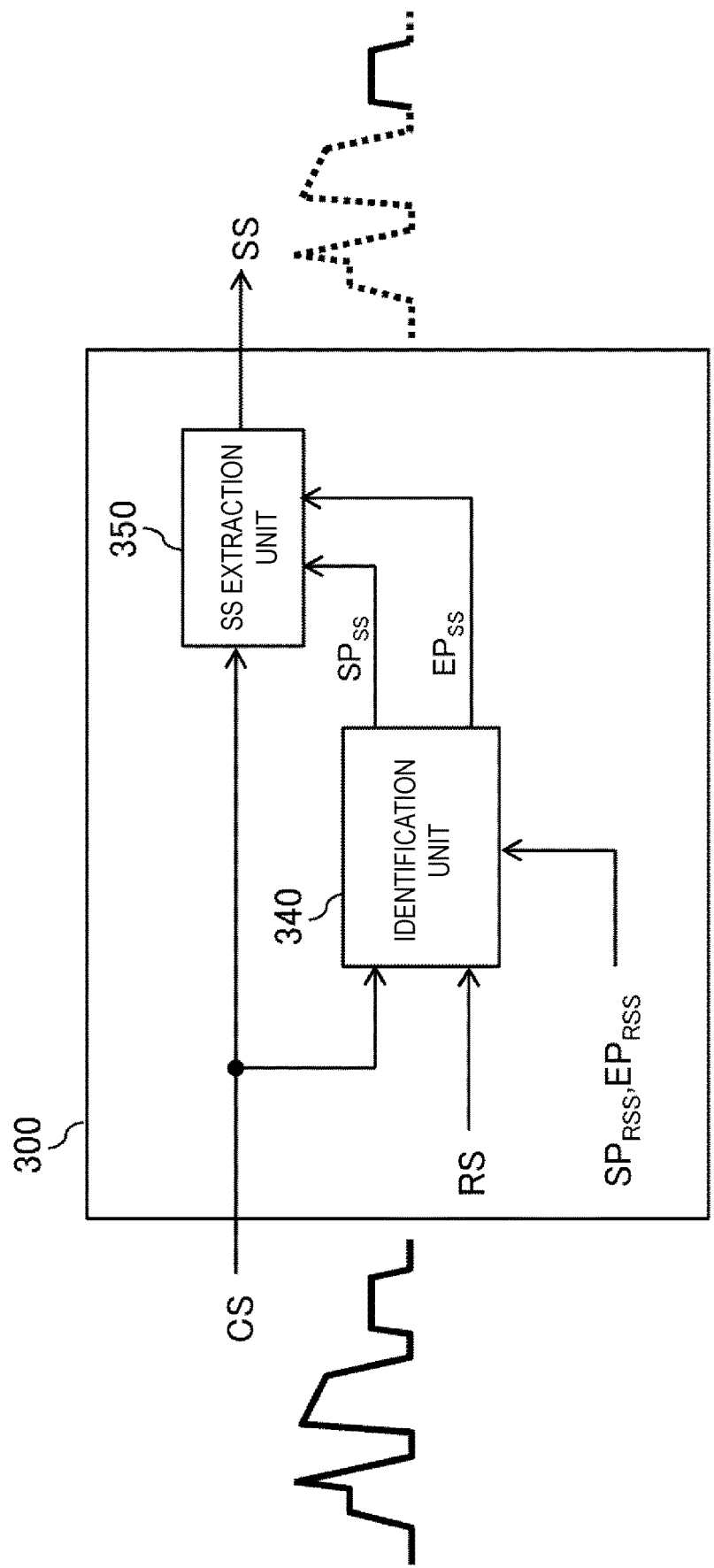
FIG. 2 is a block diagram illustrating the configuration of main portion of the anomaly detection system according to the embodiment.

Thus, embodiments extract a specific subsequence (SS) from a composite sequence (CS) using a dynamic time warping method (hereinafter referred to as DTW). Hereinafter, extraction of a specific subsequence SS according to the embodiment will be described more specifically with reference to FIG. 2. FIG. 2 is a block diagram illustrating the configuration of the extraction unit according to the embodiment.

As shown in FIG. 2, the extraction unit 300 of the embodiment includes an identification unit 340 for identifying a start point and an end point of a subsequence, and an SS extraction unit 350 for extracting a subsequence section.

The identification unit 340 identifies the start point (SPSS) and the end point (EPSS) of the subsequence of the composite sequence (CS) from the start point (SPRSS) and the end point (EPRSS) of the composite sequence (CS) and the reference subsequence (RSS). Here, the reference subsequence (RSS) is a subsequence of the reference sequence (RS). The reference sequence RS is an example of a composite sequence acquired in advance, and may be, for example, the ideal detection target signal described above. The identification unit 340 refers to the optimal warping path (P) as the first optimal warping path representing the temporal correspondence between the composite sequence (CS) and the reference sequence (RS).

The SS extraction unit 350 extracts the sequence of the section of the start point (SPSS) to the end point (EPSS) of the input subsequence from the input composite sequence (CS), and outputs the extracted sequence as the subsequence (SS).

Next, the DTW will be described. The DTW is a method for measuring the similarity degree of different time-series data. The DTW is a calculation method in which the distances of the values at the respective time points of the two time series are compared by "round-robin", and a relationship in which the value of the "distance" between the time series becomes the smallest is found. The "distance" between the time series is referred to as a DTW distance, and a relationship in which the DTW distance is the smallest is referred to as an optimal warping path. The DTW can measure the degree of similarity even if the data lengths of the time series are not uniform, the phases are shifted, and the frequencies are different. Moreover, it's the algorithm in which the shape of the time series the human judges is intuitively similar has the small value of the DTW distance.

Figure 3:
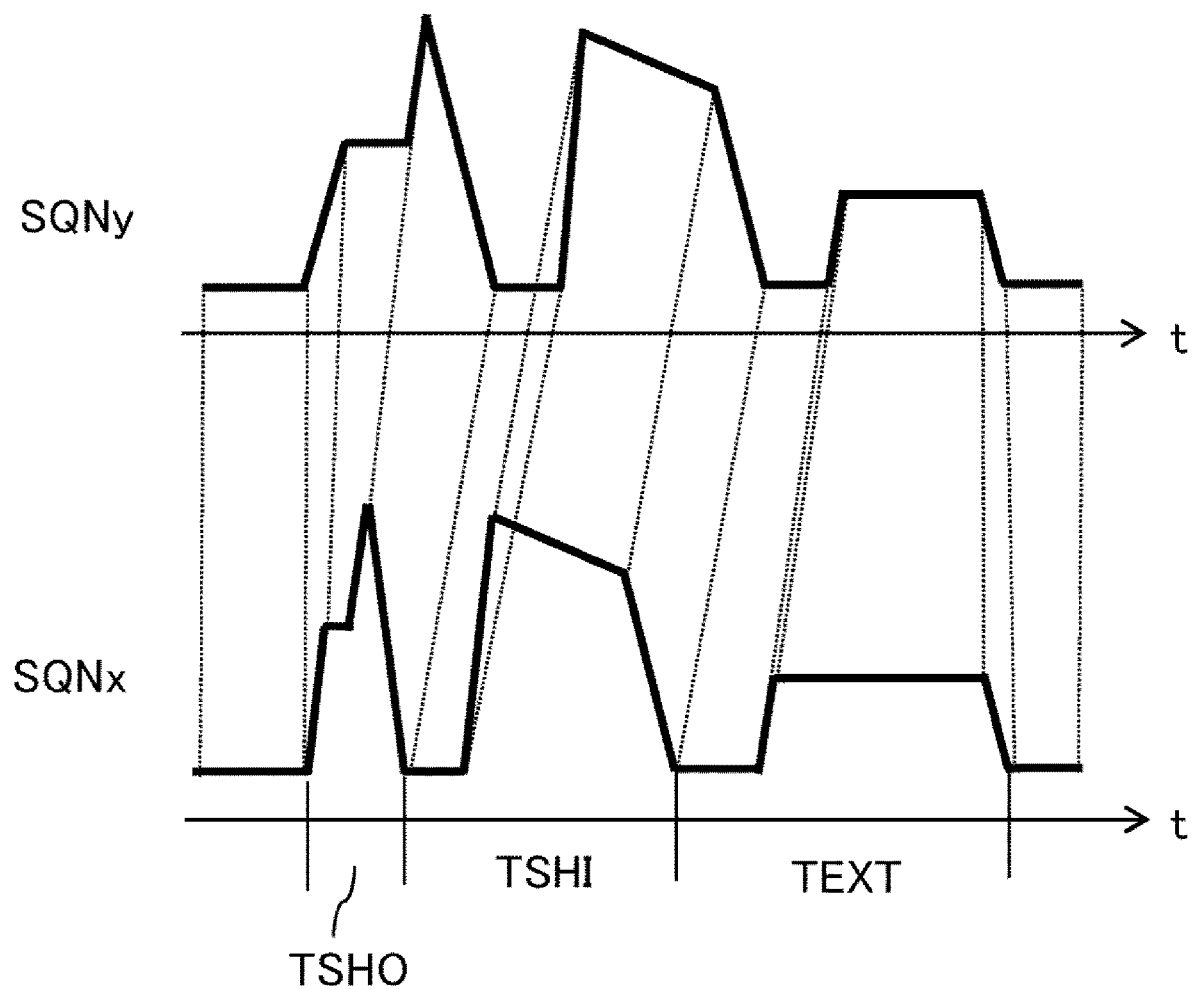
FIG. 3 is a diagram illustrating the temporal difference between two sequences.
Figure 4:
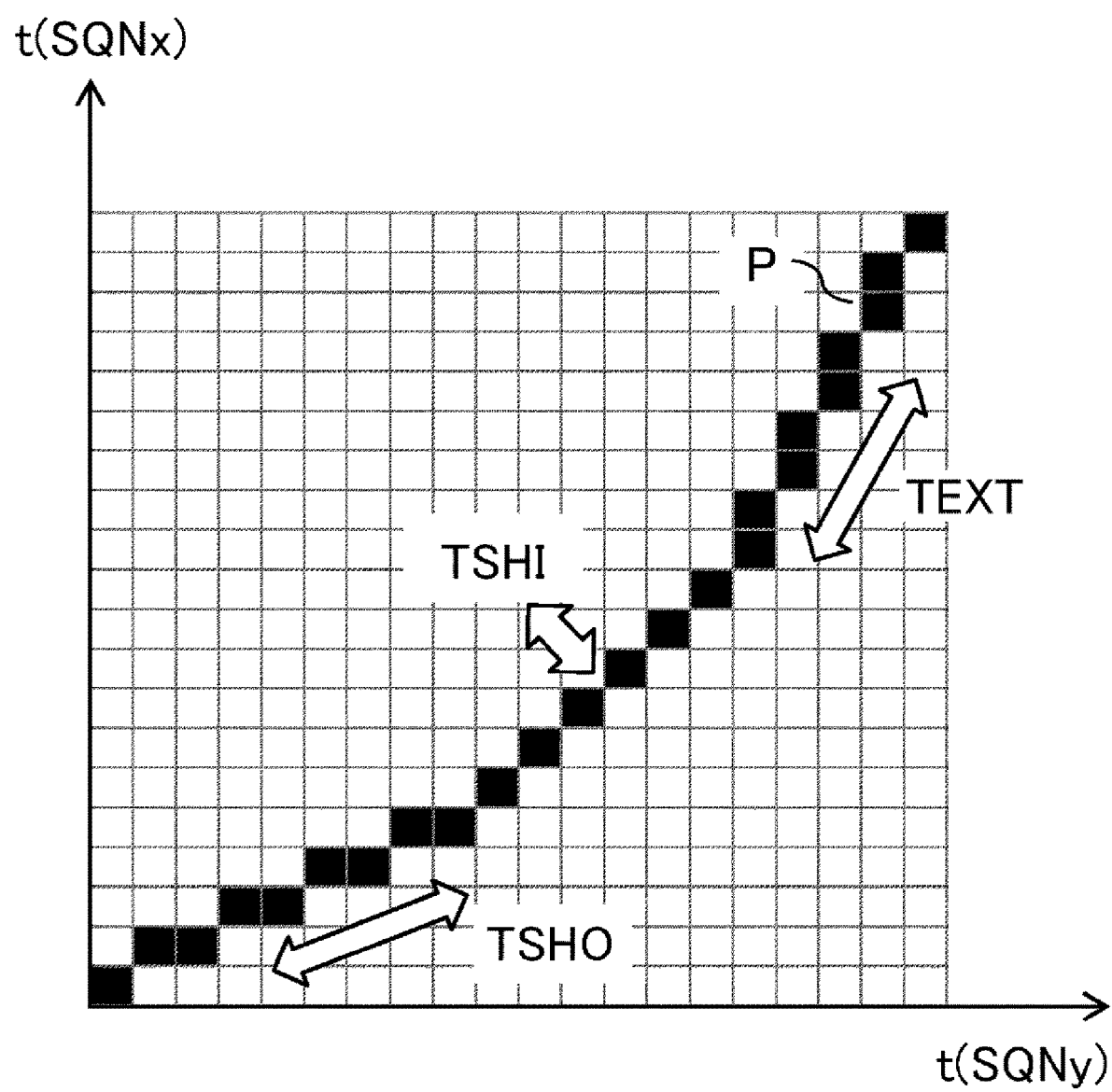
FIG. 4 is a diagram illustrating the concept of the optimal warping path based on the DTW in the two sequences described in FIG. 3.

The optimal warping paths of the two sequences based on the DTW will be described with reference to FIGS. 3 and 4. FIG. 3 shows the temporal difference between two sequences. FIG. 4 shows a conceptual diagram of the optimal warping paths in the two sequences described in FIG. 3 based on DTW. In FIGS. 3 and 4, the sequence x is denoted by SQNx, the sequence y is denoted by SQNy, the time shortening is denoted by TSHO, the time shifting is denoted by TSHI, the time extending is denoted by TEXT, and the optimal warping paths are denoted by P. In FIG. 4, the horizontal axis represents the time (t) of the sequence y, and the vertical axis represents the time (t) of the sequence x.

As described above, DTW is a technique for determining a distance measure between two sequences. As shown in FIG. 3, temporal TSHO, TEXT or TSHI occurs between two sequences x and y. Again, the DTW defines a distance measure (DTW distance) that can be evaluated as a sequence in which the two sequences x and y are similar. In addition, from the integrated cost matrix calculated when obtaining the DTW distance, the time correspondence relationship between the two sequences x and the sequence y, which is called the optimal warping path (P) as shown in black rectangular regions of FIG. 4, can be obtained. Hereinafter, a basic calculation method for determining the DTW distance and the optimal warping path (P) will be described.

First, two sequences x and y having sequence lengths of N and M, respectively, are defined below.
x=(x1, x2, . . . , xn, . . . , xN) y=(y1, y2, . . . , ym, . . . , yM)
where n and m of the index are the discrete times with respect to the sequences x and y, and xn, ym are the scalar values at the discrete times, respectively.

A conventional distance measure, such as the Euclidean distance used for DTW distance, is then used to calculate a cost matrix of "N×M", hereinafter also referred to as "C", which is the distance of all combinations between the two sequences.

C=cn,m=|xn−ym|2 then determine the integrated cost matrix (hereinafter also referred to as "D") based on the dynamic-programming method. In naive DTW, the element dn,m of the integrated cost matrix (D) is calculated by the following equation:

$$d_{n,m} = c_{n,m} + \min \begin{cases} d_{(n-1),m} \\ d_{n,(m-1)} \\ d_{(n-1),(m-1)} \end{cases} \quad \text{(Equation 1)}$$

for $n \in [1:N]$ and $m \in [1:M]$

Here, as an initial condition, the following factors are first calculated:
d0,0=0 dn,0=∞ for n∈E[1:N] d0,m=∞ for m∈[1:M] d1,1=c1,1. Here, the integrated cost matrix is a (N+1)×(M+1) matrix to which the element dn,0, d0,m is added. The last calculated dN,M is then defined as the DTW distance. Further, the optimal warping path (P) can be calculated from the integrated cost matrix (D) calculated in the calculation process of the DTW distance. The optimal warping path (P) is defined as the sequence of the following equation:
P=(p1, p2, . . . , pl, . . . , pL)T, where pl is the l-th time warping step, pl=(nl, ml), defined by the combinations of n and m, the indices of the two sequences x and y. When the integrated cost matrix (D) is calculated in a naive DTW method, pl−1 of the (l−1)-th time warping step to the l-th time warping step pl is determined as follows.

$$p_{l-1} = \begin{cases} ((n_l - 1), m_l) & \text{if } d_{n_l, m_l} = d_{(n_l-1), (m_l)} + c_{n_l, m_l} \\ (n_l, (m_l - 1)) & \text{if } d_{n_l, m_l} = d_{(n_l), (m_l-1)} + c_{n_l, m_l} \\ ((n_l - 1), (m_l - 1)) & \text{if } d_{n_l, m_l} = d_{(n_l-1), (m_l-1)} + c_{n_l, m_l} \end{cases} \quad \text{(Equation 2)}$$

Here, pL=(N, M) as an initial condition, p1=(1, 1) as a boundary condition are given, and an optimal warping path (P) is determined by obtaining pl in the reverse order from pL.

Figure 5:
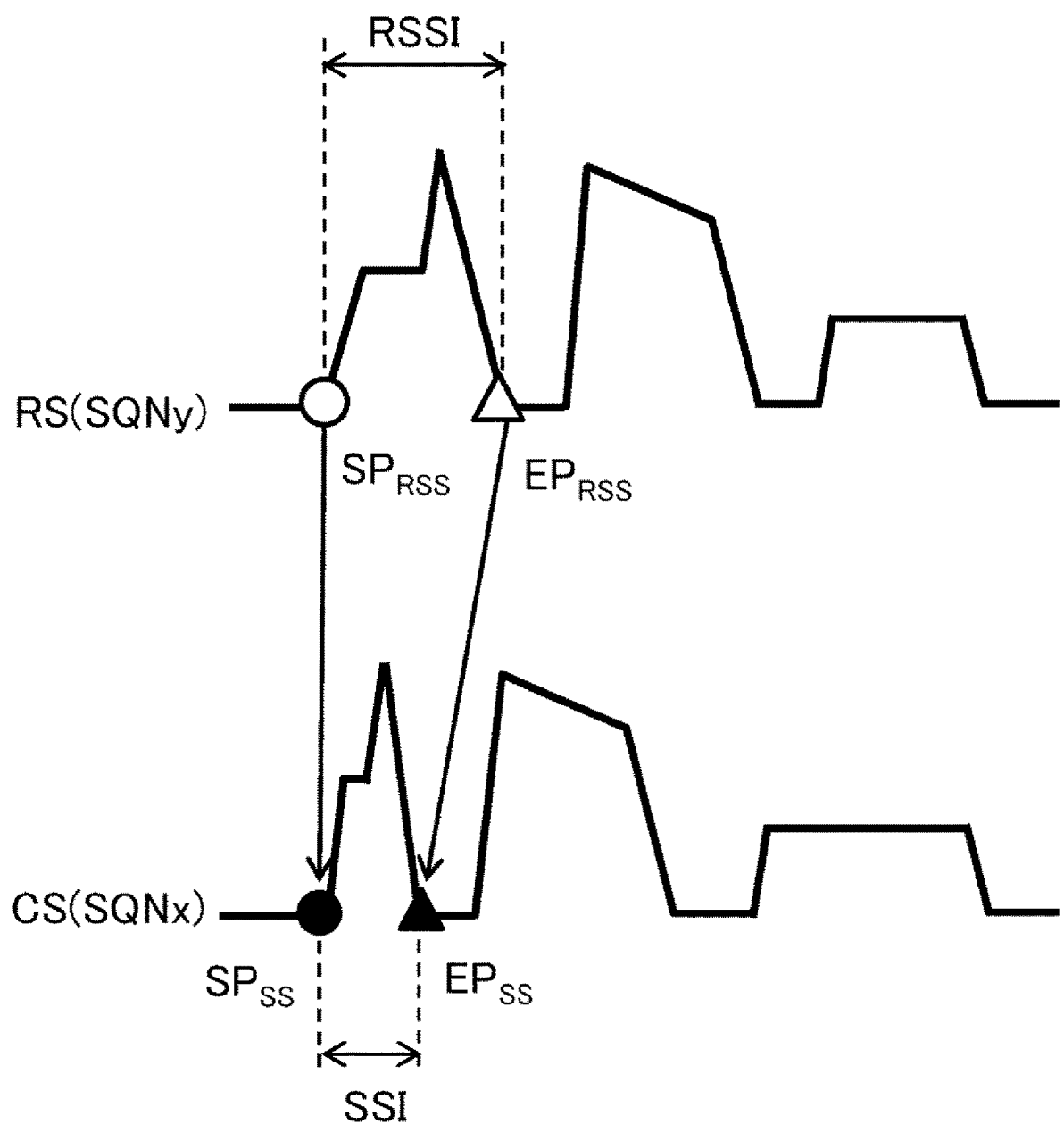
FIG. 5 is a diagram illustrating the relationship between the reference sequence and the composite sequence handled by the anomaly detection system of FIG. 2.
Figure 6:
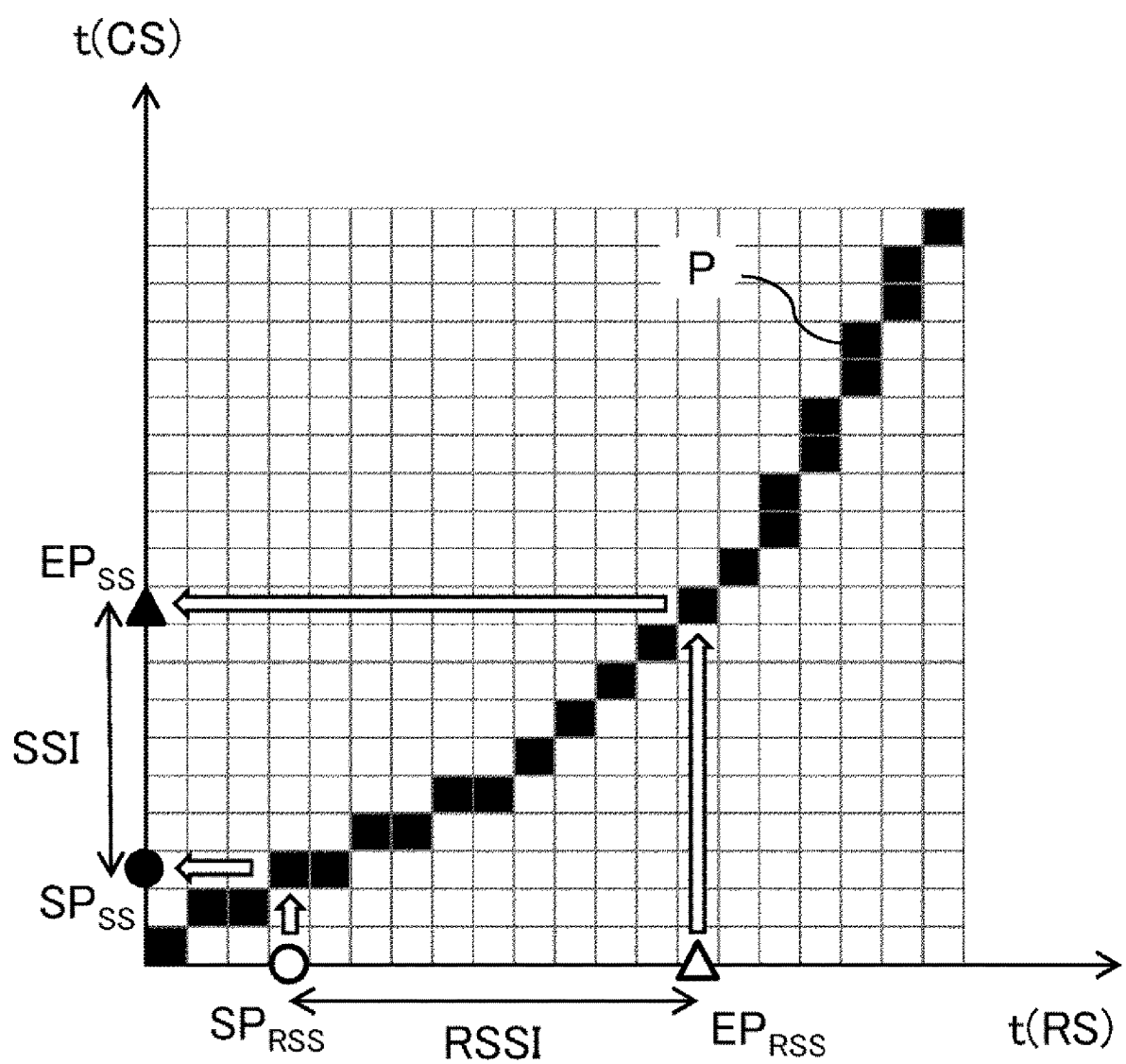
FIG. 6 is a diagram illustrating a concept in which the identification unit of FIG. 2 extracts a subsequence from a composite sequence using a reference sequence.

Next, a method of identifying the start point and the end point of the subsequence section of the composite sequence (CS) from the start point and the end point of the subsequence section of the reference sequence (RS) will be described with reference to FIGS. 5 and 6. FIG. 5 is a diagram illustrating a relationship between a reference sequence and a composite sequence. FIG. 6 is a diagram illustrating a concept of extracting a subsequence of a composite sequence from a reference sequence. Here, in FIG. 5, the composite sequence (CS) is also denoted as SQNx, and the reference sequence (RS) is also denoted as SQNy. In FIG. 6, the horizontal axis represents the time (t) of the reference sequence (RS), and the vertical axis represents the time (t) of the composite sequence (CS).

As shown in FIG. 6, the identification unit 340 calculates an optimal warping path of the reference sequence (RS) and the composite sequence (CS) by the DTW. Here, as shown in FIG. 5, the subsequence interval on the reference sequence (RS) is referred to as a reference subsequence interval (RSSI), and the subsequence interval on the composite sequence (CS) is referred to as a subsequence interval (SSI). As shown in FIG. 6, the identification unit 340 searches for the start point (SPSS) of the subsequence interval (SSI) from the optimal warping path using the start point (SPRSS) of the reference subsequence interval (RSSI) as a key. The identification unit 340 searches for the end point (EPSS) of the subsequence interval (SSI) from the optimal warping path (P) using the end point (EPRSS) of the reference subsequence interval (RSSI) as a key. Here, the start point (SPRSS) and the end point (EPRSS) of the reference subsequence section (RSSI) are stored in advance in the storage unit.

The SS extraction unit 350 identifies a subsequence interval (SSI) on the composite sequence by the start point (SPSS) and the end point (EPSS) of the subsequence interval (SSI), and extracts the subsequence (SS).

According to an embodiment, the subsequence (SS) to be extracted can be specified by determining the reference sequence (RS) and the start point (SPRSS) and end point (EPRSS) of the reference subsequence interval (RSSI).

Since a specific subsequence (SS) can be extracted, it is possible to use a reference parameter for anomaly detection that focuses on the specific subsequence (SS), and it is possible to improve the accuracy of anomaly detection. In addition, since the volume of the reference parameter of anomaly detection required for the anomaly detection processing can be reduced, it is possible to reduce the memory resource and calculation amount.

The subsequence (SS) to be extracted can be intuitively specified by preparing the reference sequence (RS) and determining the start point (SPRSS) and the end point (EPRSS) of the reference subsequence interval (RSSI). As a result, since the amount of work is constant regardless of the skill of the technician who is the user, it is possible to easily incorporate it as one of the operations of the production line.

Figure 7:
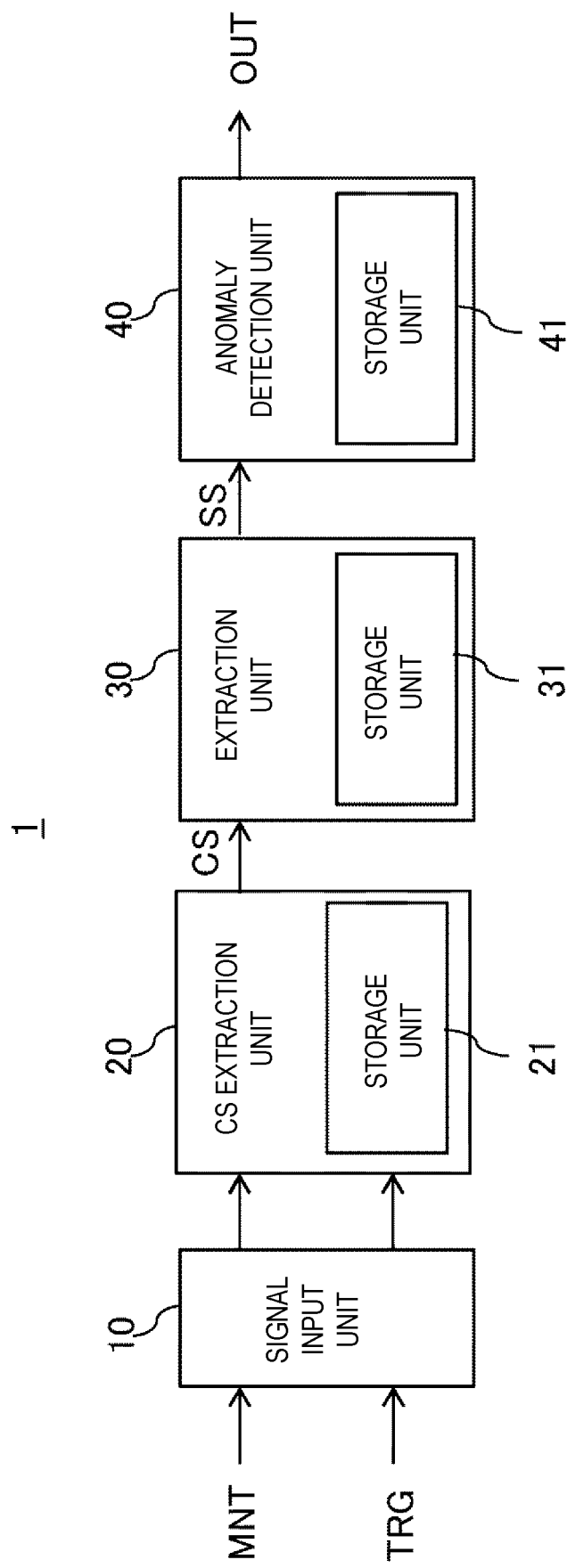
FIG. 7 is a block diagram illustrating the configuration of the anomaly detection system in the first embodiment.

First, the anomaly detection system in the first embodiment will be described with reference to FIG. 7. FIG. 7 is a block diagram illustrating the configuration of the anomaly detection system in the first embodiment.

As shown in FIG. 7, the anomaly detection system 1 includes a signal input unit 10, a CS extraction unit 20, an extraction unit 30, and an anomaly detection unit 40. Here, the CS extraction unit 20 extracts a composite sequence CS. The extraction unit 30 extracts a subsequence SS. The anomaly detection unit 40 detects an anomaly of the subsequence SS. The signal input unit 10, the composite sequence extraction unit 20, the subsequence extraction unit 30, and the subsequence anomaly detection unit 40 represent processing units in software.

The CS extraction unit 20 includes a storage unit 21 that stores extraction conditions of the composite sequence CS. The extraction unit 30 includes a storage unit 31 for storing extraction conditions of the subsequence SS. The anomaly detection unit 40 includes a storage unit 41 for storing an anomaly detection condition of the subsequence SS. The extraction unit 30 corresponds to the extraction unit 300 of the embodiment.

The signal input unit 10 outputs a monitor signal (MNT) including a detection target such as sensor data to be input and a trigger signal (TRG) such as an enable signal indicating a specific time interval to the CS extraction unit 20 as a time-series digital signal. When the input monitor signal (MNT) and trigger signal (TRG) are analog signals, the signal input unit 10 converts them into digital signals using an analog-to-digital conversion circuit (ADC). This makes it possible to obtain discrete time-series digital signals that can be processed by software.

The input monitor signal (MNT) and trigger signal (TRG) may be digital signals. For example, when input is performed using physical interfaces such as LAN (Local Area Network) based on a communication protocol such as TCP/IP, the signal input unit 10 includes a signal reception unit based on the communication protocol. For example, in a semiconductor manufacturing plant, sensor signals of a semiconductor manufacturing device can be inputted using a communication protocol called SECS (Semi Equipment Communication Standard). RS232C and LANs are used as physical interfaces for SECS.

The CS extraction unit 20 outputs a signal including a finite width extracted from the monitor signal (MNT) in the time interval indicated by the trigger signal (TRG) to the extraction unit 30 as a composite sequence (CS). Composite sequences (CSs) are signals of a time interval during which a manufacturing device to be detected processes a composite process comprising a series of sub-processes. The composite process is a process of sequentially processing a plurality of processes such as a first sub-process, a second sub-process, and a third sub-process. The composite step may be a step of sequentially processing a testing step for calibration of the manufacturing device and a main step in which the manufacturing device substantially operates for its original purposes. However, it is assumed that the order of the constituent sub-steps does not change.

The trigger signal (TRG) is a signal indicating a target time interval, and examples thereof include a signal in which the value of the target time interval is "1" and the other time intervals are "0". The CS storage unit 21 stores a condition for determining a target time interval from the trigger signal TRG. For example, the CS extraction unit 20 determines a time interval in which the trigger signal (TRG) is equal to or greater than a threshold value (e.g., 0.5) as a target time interval. In this case, "0.5" which is a threshold value is stored as an extraction condition of the composite sequence (CS) in the storage unit 21. The CS extraction unit 20 determines a time interval to be extracted from the trigger signal TRG based on the condition stored in the storage unit 21. As a result, unnecessary sections can be removed from the monitor signal MNT. The CS extraction unit 20 extracts a monitor signal (MNT) of a target time interval as a composite sequence (CS), and outputs the composite sequence (CS) to the extraction unit 30.

The extraction unit 30 extracts a signal of a finite section corresponding to a specific sub-step processed by the manufacturing device from the input composite sequence (CS), and outputs the extracted signal as a subsequence (SS) to be a target of anomaly detection to the anomaly detection unit 40. The time interval of the signal serving as the subsequence SS is specified based on the condition stored in the storage unit 31 by applying the DTW. Detailed processing of the extraction unit 30 will be described later.

The anomaly detection unit 40 performs anomaly detection processing on the input subsequence (SS) based on the anomaly detection condition of the subsequence (SS) stored in the storage unit 41, and outputs an output signal (OUT) such as the result of anomaly detection. For the anomaly detection processing, for example, a method using a neural network algorithm is used. In this case, the storage unit 41 stores the structure of the network layer representing the structure of the neural network, and the weight parameters, bias parameters, and the like held by each layer.

The output signal OUT is output as an analog signal or a digital signal. For example, the output signal OUT is output as a voltage signal that lights an LED for indicating the result of the anomaly detection to the user. The output signal OUT may be a signal that notifies another system of the result of the anomaly detection processing or the computation result of the process of the anomaly detection processing using physical interfaces such as LANs based on communication protocols such as TCP/IP.

Figure 8:
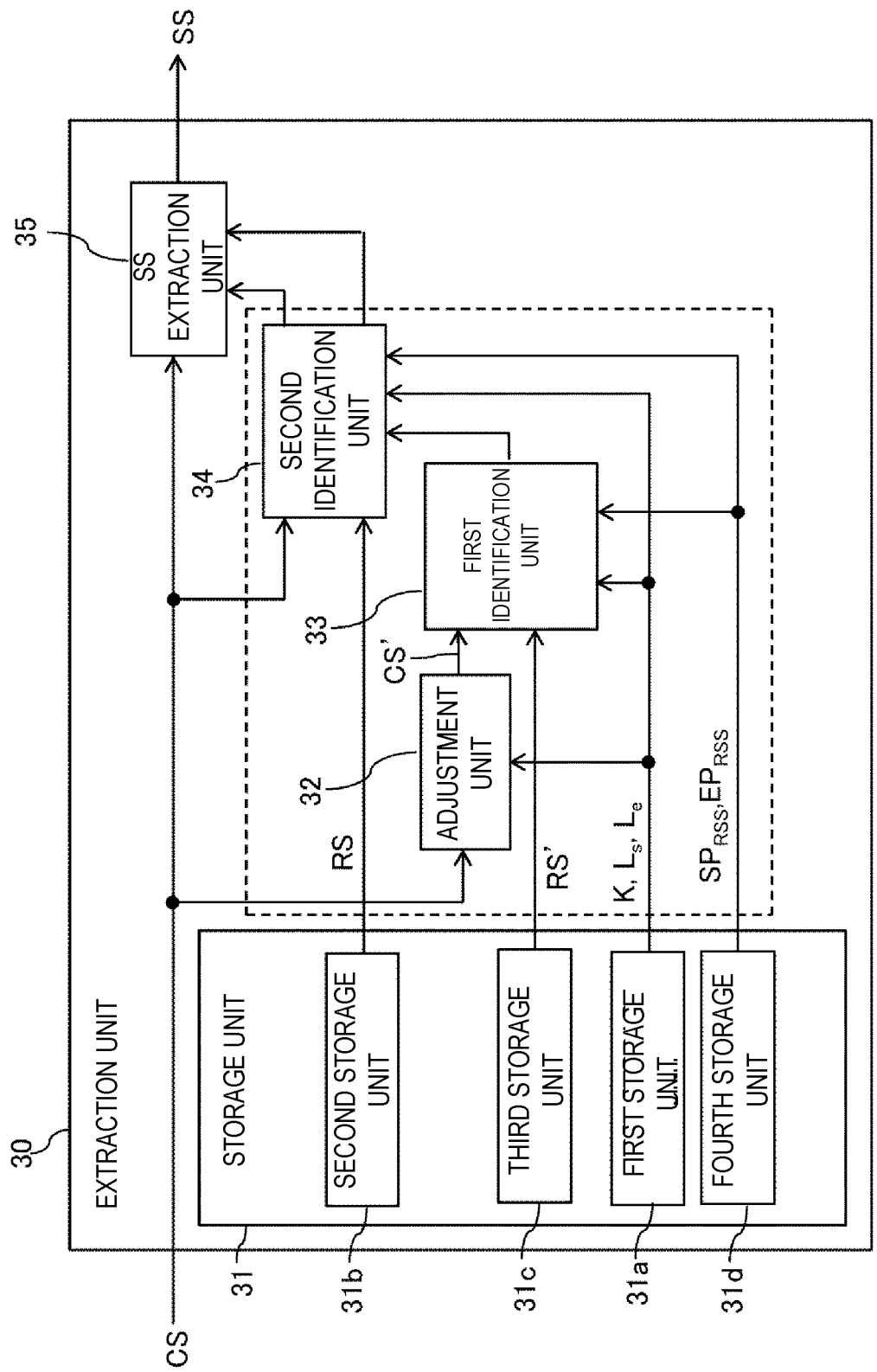
FIG. 8 is a block diagram illustrating the configurations of the extraction unit 30 and the storage unit 31 of FIG. 7.

Next, the extraction unit 30 will be described in detail with reference to FIG. 8. FIG. 8 is a block diagram illustrating the configurations of the extraction unit 30 and the storage unit 31.

The extraction unit 30 includes an adjustment unit 32, a first identification unit 33, a second identification unit 34, and an SS extraction unit 35. The adjustment unit 32 adjusts the sampling interval of the composite sequence CS. The first identification unit 33 specifies the start area and the end area of the subsequence section (SSI) of the composite sequence (CS). The second identification unit 34 specifies the start point and the end point of the subsequence section (SSI) of the composite sequence (CS). Similar to the SS extraction unit 350 of the embodiment, the SS extraction unit 35 specifies the subsequence section (SSI) of the composite sequence (CS) and extracts the subsequence (SS).

The storage unit 31 includes a first storage unit 31a, a second storage unit 31b, a third storage unit 31c, and a fourth storage unit 31d. The first storage unit 31a stores the adjustment condition of the sampling interval. The second storage unit 31b stores a reference sequence RS acquired in advance. The third storage unit 31c stores a reference sequence (RS') in which the sampling interval is adjusted from the reference sequence (RS) acquired in advance. Hereinafter, the reference sequence in which the sampling interval is adjusted is referred to as a DS reference sequence RS'. The fourth storage unit 31d stores a start point (SPRSS) and an end point (EPRSS) of the subsequence section (RSSI) on the reference sequence (RS).

The adjustment unit 32 receives the composite sequence (CS) as an input, adjusts the sampling interval of the composite sequence (CS) by averaging or complementing processing, and outputs the composite sequence (CS') in which the sampling interval is adjusted. Hereinafter, the composite sequence in which the sampling interval is adjusted is referred to as a DS composite sequence CS'. The adjustment of the sampling interval is mainly a down-sampling processing, and is a processing for extracting any data such as a maximum average value, a minimum value, and a median value of adjacent data points of a number specified by a down-sampling coefficient (hereinafter, referred to as "K"), for example. The first storage unit 31a stores the down-sampling coefficient (K).

Figure 9:
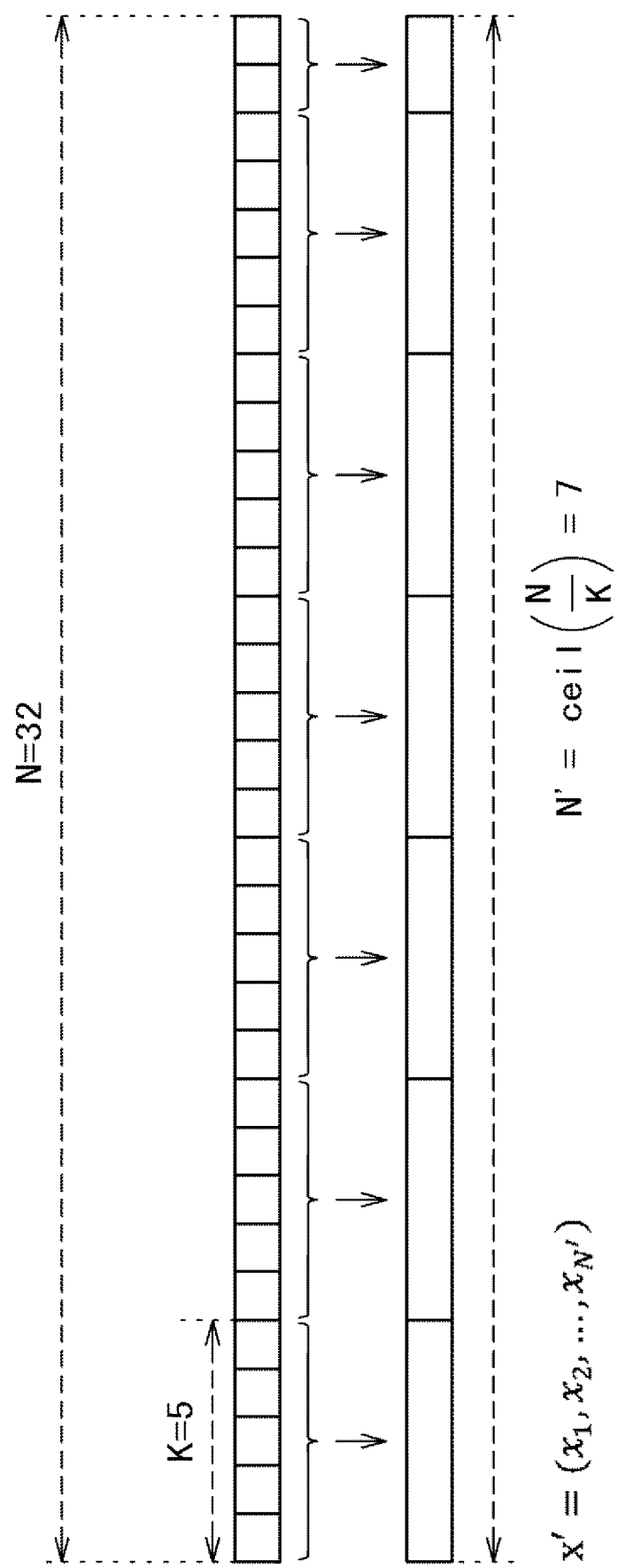
FIG. 9 is a diagram illustrating an outline of sampling adjustment processing for the composite sequence in the adjustment unit of FIG. 8.

Next, the sampling adjustment processing will be described with reference to FIG. 9. FIG. 9 is a diagram illustrating an outline of the sampling adjustment processing for the composite sequence.

As shown in FIG. 9, for example, the input composite sequence (CS) is a sequence before sampling adjustment processing (hereinafter, referred to as a pre-adjustment sequence), which is expressed by the following equation.

$x=(x1, x2, \ldots, xN)$, where N is the sequence length of the pre-adjustment sequence, e.g., N=32, and K=5 is set as the sampling adjustment condition. Then, the down-sampling processing is performed on the first to 30th data points every five data points. The 31st to 32nd data points, the number of which data points is two less than K, are subjected to the same processing as the down-sampling processing for 5 data points, for example.

The sequence after the sampling adjustment processing (hereinafter referred to as the adjusted sequence) is expressed by the following equation. $x'=(x'1, x'2, \ldots, x'N')$, where N' is the sequence length of the adjusted sequence and N'=7 as shown in FIG. 9. Note that "ceil" is a function for rounding up decimal points.

Figure 10:
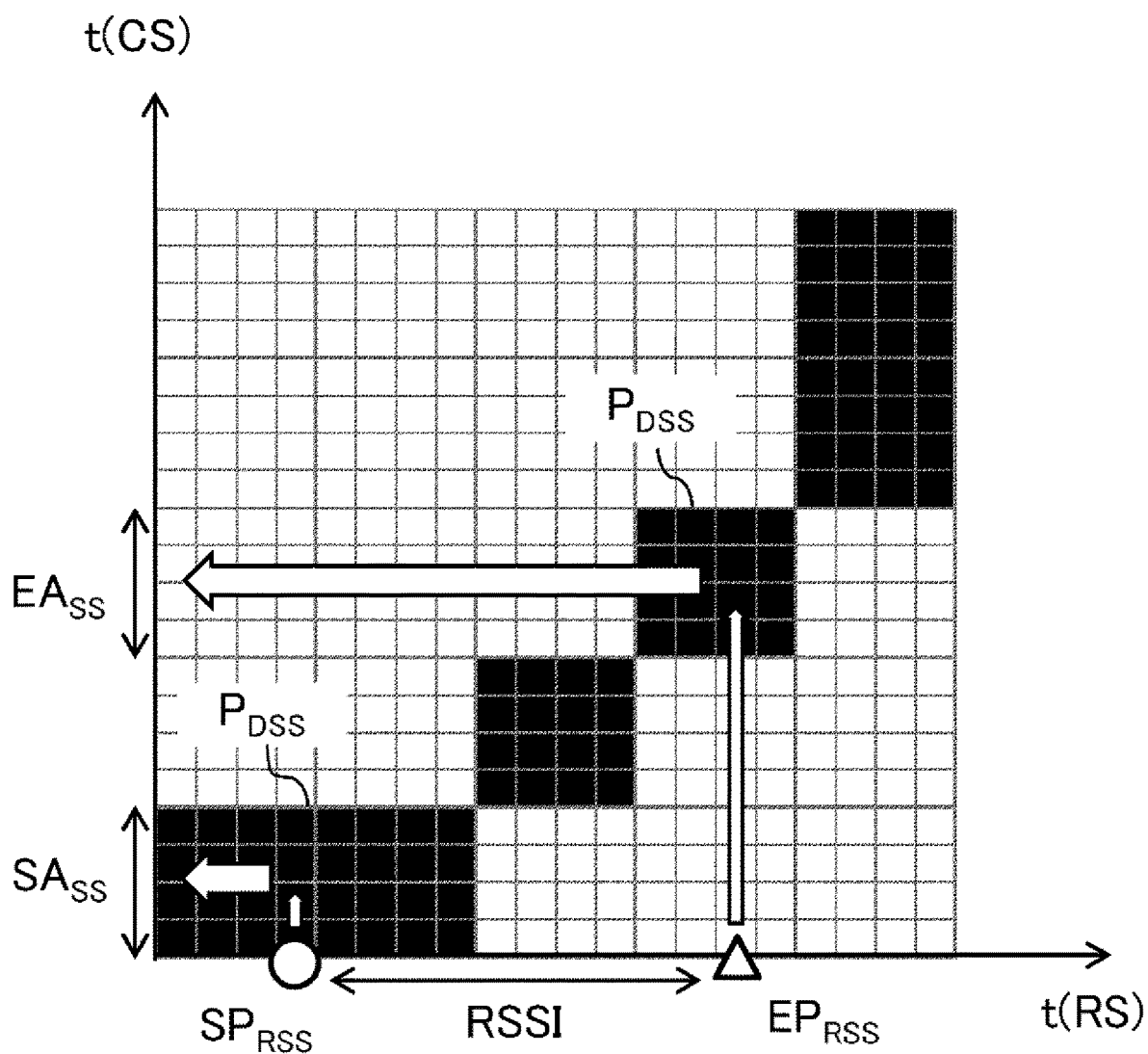
FIG. 10 is a diagram illustrating a method of identifying a start area and an end area of a subsequence using a down-sampled composite sequence in the first identification unit of FIG. 8.

The first identification unit 33 will be described with reference to FIG. 10. FIG. 10 is a diagram illustrating a method of identifying a start area and an end area of a subsequence using a down-sampled composite sequence.

Similarly to FIG. 4, the first identification unit 33 refers to the optimal warping path to determine the start area (SASS) and the end area (EASS) of the subsequence section (SSI) from the DS composite sequence (CS') and the DS reference sequence (RS'). Here, the subsequence interval (SSI) is a subsequence interval on the composite sequence (CS). The DS reference sequence RS' is stored in the third storage unit 31c in advance.

First, the first identification unit 33 obtains the optimal warping path (PDSS) in the down-sampling space as the second optimal warping path by the DTW between the DS composite sequence (CS') and the DS reference sequence (RS'). Here, the down-sampling space is a down-sampled sampling space. In FIG. 10, the optimal PDSS is four black rectangular regions. Calculation to determine the optimal warping path (PDSS) in the down-sampling space reduces the computational complexity by a factor of K2 relative to the computational complexity of the optimal warping path (P) for the two sequences of the original sampling space. Here, K is the down-sampling factor described above.

Next, the first identification unit 33 obtains the start area (SASS) of the subsequence section (SSI) of the original sampling space corresponding to the start point (SPRSS) of the reference subsequence section (RSSI) based on the optimal warping path (PDSS). Here, the reference subsequence interval (RSSI) is a subsequence interval on the reference sequence (RS). The first identification unit 33 obtains the end area (EASS) of the subsequence section (SSI) of the original sampling space corresponding to the end point (EPRSS) of the subsequence section (RSSI) based on the second optimal warping path (PDSS). Here, the start point (SPRSS) and the end point (EPRSS) of the reference subsequence section (RSSI) are stored in the fourth storage unit 31d in advance.

As shown in FIG. 10, a plurality of points on the down-sampled composite sequence (CS) may correspond to the start point (SPRSS) and the end point (EPRSS) of the reference subsequence interval (RSSI). In this case, each of the areas corresponding to all the points of the composite sequence (CS) in the original sampling space are defined as the start area and the end area of the subsequence.

Figure 11:
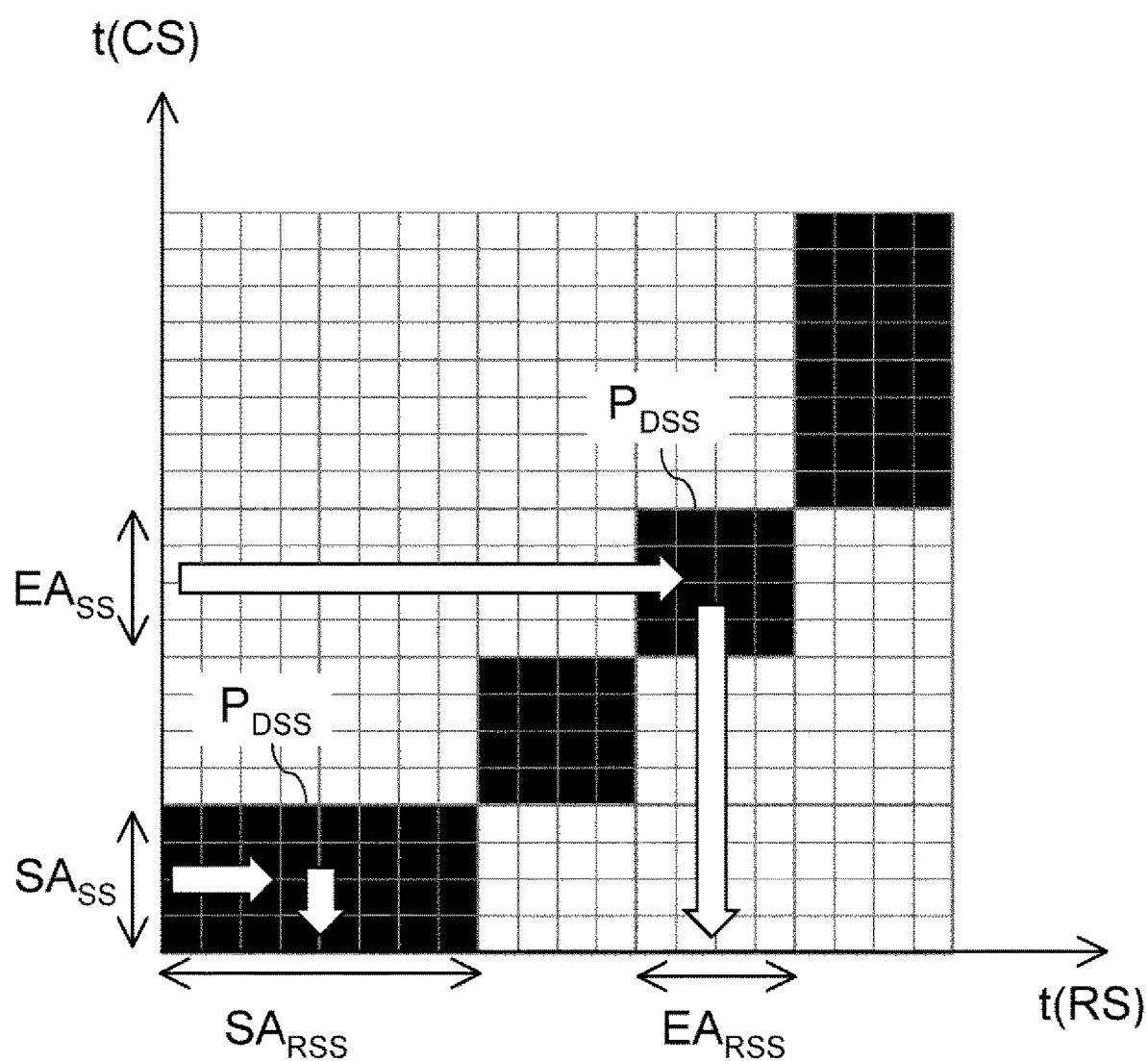
FIG. 11 is a diagram for explaining a method of calculating a start area and an end area of the reference subsequence from the start area and the end area of the subsequence in the second identification unit of FIG. 8.
Figure 12:
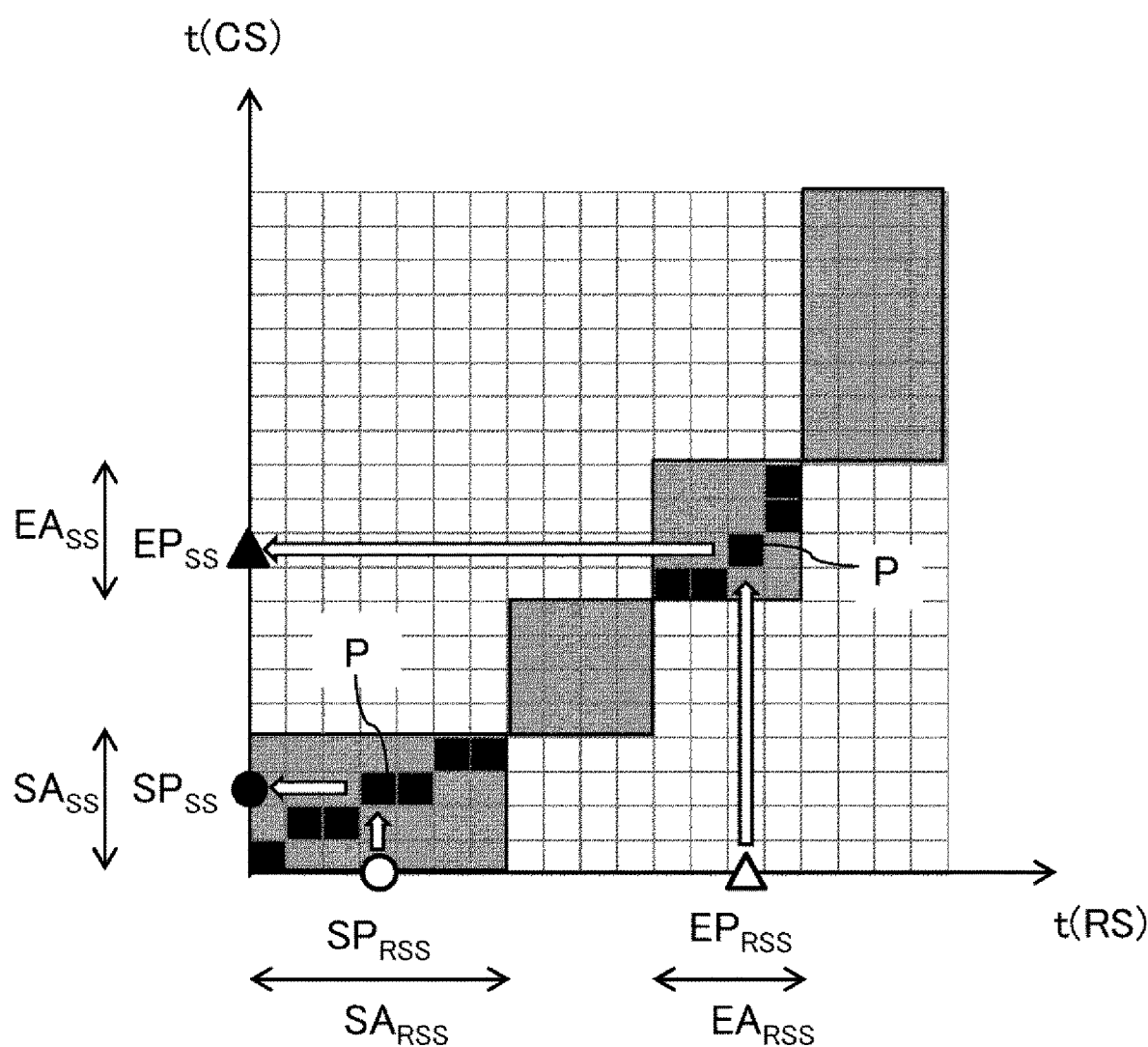
FIG. 12 is a diagram for explaining a method of calculating a start point and an end point of a subsequence from the start area and the end area of the reference subsequence in the second identification unit of FIG. 8.

The second identification unit 34 will be described with reference to FIGS. 11 and 12. FIG. 11 is a diagram for explaining a method of calculating a start area and an end area of the reference subsequence from the start area and the end area of the subsequence. FIG. 12 is a diagram for explaining a method of calculating a start point and an end point of a subsequence from the start area and the end area of the reference subsequence. In FIGS. 11 and 12, the horizontal axis represents the time (t) of the reference sequence (RS), and the vertical axis represents the time (t) of the composite sequence (CS).

The second identification unit 34 receives the start area (SASS) and the end area (EASS) of the subsequence section (SSI) obtained by the first identification unit 33, and identifies the start point (SPSS) and the end point (EPSS) of the subsequence section (SSI).

First, as shown in FIG. 11, the second identification unit 34 refers to the optimal warping path (PDSS), and calculates the start area (SARSS) of the reference subsequence interval (RSSI) backward from the start area (SASS) of the input subsequence interval (SSI). The second identification unit 34 refers to the optimal warping path (PDSS), and calculates the end area (EARSS) of the reference subsequence interval (RSSI) backward from the end area (EASS) of the input subsequence interval (SSI).

A plurality of points on the DS-reference sequence (RS') may correspond to the start area (SASS) and the end area (EASS) of the subsequence interval (SSI). Here, the areas on the reference sequence (RS) of the original sampling space corresponding to all the points are defined as the start area (SARSS) and the end area (EARSS) of the reference subsequence interval (RSSI).

Next, as shown in FIG. 12, the second identification unit 34 calculates the optimal warping path (P) as the third optimal warping path by the DTW for the two short sequences of the start area (SASS) of the subsequence section (SSI) and the start area (SARSS) of the reference subsequence section (RSSI), similarly to FIG. 6. The second identification unit 34 refers to the optimal warping path (P) and obtains the start point (SPSS) of the subsequence interval (SSI) corresponding to the start point (SPRSS) of the reference subsequence interval (RSSI).

Similarly, the second identification unit 34 calculates the optimal warping path (P) as the third optimal warping path for two short sequences of the end area (EASS) of the subsequence section (SSI) and the end area (EARSS) of the reference subsequence section (RSSI). The second identification unit 34 refers to the optimal warping path (P) and obtains the end point (EPSS) of the subsequence section (SSI) corresponding to the end point (EPRSS) of the reference subsequence section (RSSI).

The second identification unit 34 outputs the calculated start point (SPSS) and end point (EPSS) of the subsequence section (SSI) to the SS extraction unit 35.

The SS extraction unit 35 extracts the sequence of the section of the end point (EPSS) from the start point (SPSS) of the input subsequence section (SSI) from the input composite sequence (CS), and outputs the extracted sequence as the subsequence (SS).

(Modified Example)

The first identification unit 33 can adopt not only a calculation method of the optimal warping path by the naive DTW, but also a calculation method of the optimal warping path by the DTW in which the step-size condition (continuity condition, slope constraint condition) is modified.

If an anomaly amplitude variation occurs in the composite sequence (CS) compared to the reference sequence (RS), the naive DTW may obtain an optimal warping path with extreme time warping. It is then difficult to obtain the start area (SASS) and the end area (EASS) and the start point (SPSS) and the end point (EPSS) of the appropriate subsequence interval (SSI) from the composite sequence (CS). This makes it difficult to detect an anomaly in the subsequence SS.

For example, in the composite sequence (CS), assume that the voltage of the composite sequence (CS) is a 0V value when the anomaly detection target device is not idle, and the sub-process operation has a temporal variation of the positive voltage, and the non-idle voltage transitions to 0V after the sub-process is completed. It is assumed that the sub-process section is extracted as a subsequence SS. If an amplitude anomaly occurs during a sub-process such that a voltage is 0V for a certain period due to a short-circuit, the anomaly amplitude matches the non-idle voltage on the temporally separated reference sequence RS after the sub-process is completed. Therefore, it is determined that the sub-process of the composite sequence CS has been completed, and only the time interval of the sub-process until the amplitude anomaly occurred is extracted.

On the other hand, in the DTW in which the step size condition is modified, since the warping rate of time in the optimal warping path can be controlled, it is possible to obtain the optimal warping path which is robustly suitable for the anomaly amplitude variation.

The naive DTW satisfies the following condition in the optimal warping path (P).

$pl+1-pl \in \{(1, 1), (0, 1), (1, 0)\}$ for $l \in [1:L-1]$. This is called the step-size condition, Let l be the path index, l be incremented by 1, and the time steps of sequence x or sequence y or both are incremented by one step, i.e., a condition that does not allow for temporal stagnation or regress of the path.

On the other hand, it allows the progression of successive sequence x or sequence y on time steps, e.g. a plurality of discrete times of sequence y can be assigned to one discrete time of sequence x. However, the progression of successive time steps of one sequence prevents the derivation of an appropriate optimal warping path for the application.

Figure 13A:
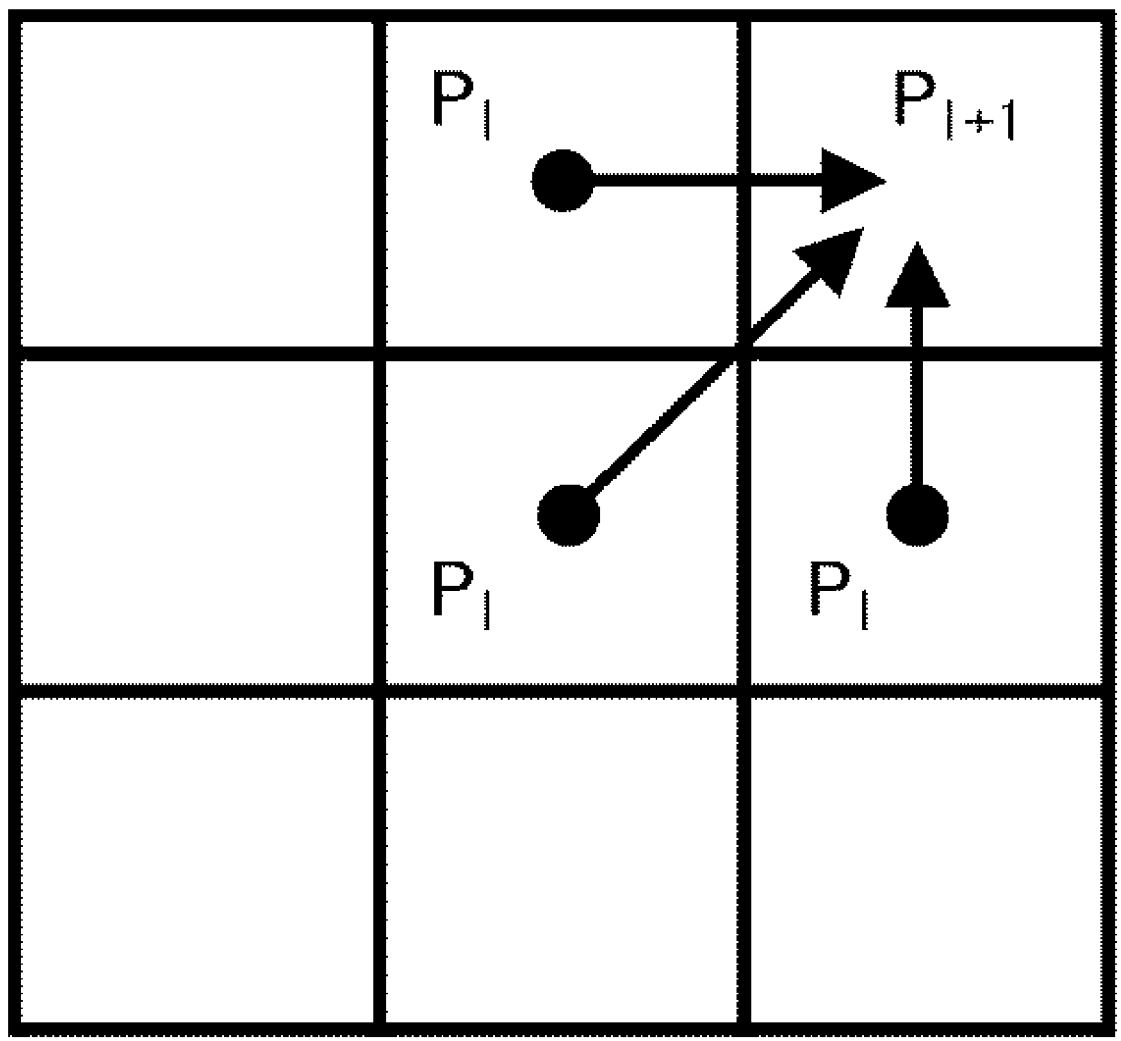
FIG. 13A is a diagram illustrating the step conditions of the naive DTW.
Figure 13B:
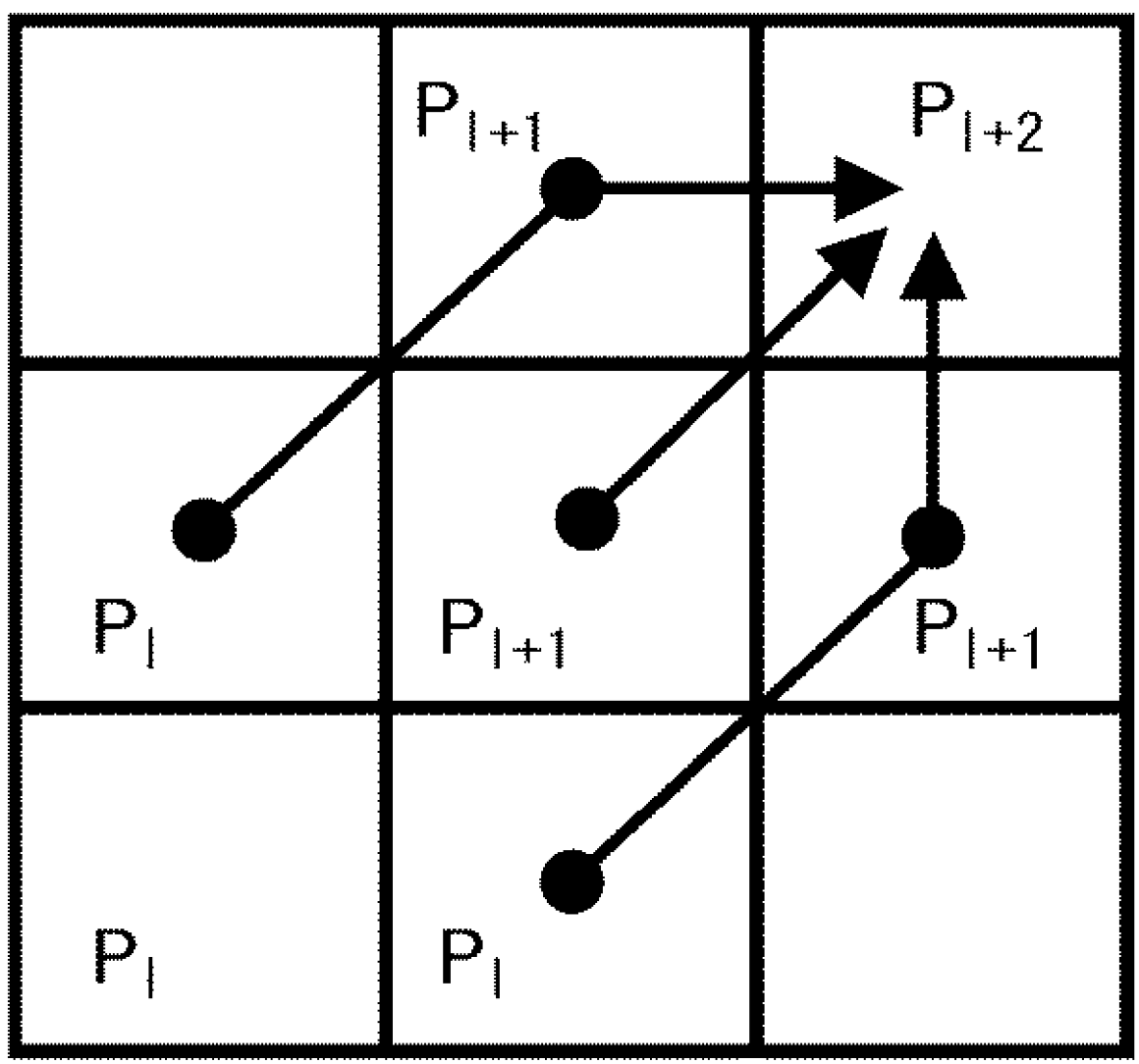
FIG. 13B is a diagram illustrating a modified example of the condition of the step size.

As one method of solving this problem, there is a method of modifying the step size constraint described above. A method of modifying the step size constraint will be described with reference to FIG. 13A, FIG. 13B. FIG. 13A is a diagram illustrating the step size condition of the naive DTW. FIG. 13B is a diagram illustrating a modification example of the step size condition.

For example, the step size constraint is modified as follows:

$pl+1-pl \in \{(1, 1), (0, 1), (1, 0)\}$ for $l \in [1:L-1]$ $pl+2-pl \in \{(2, 2), (1, 2), (2, 1)\}$ for $l \in [1:L-2]$ For the progress of the time warping path of two steps, the step size constraint is defined as that the time of at least one step proceeds for both sequences.

For example, as an example of a calculation method for determining an optimal warping path satisfying the above step size constraint, an integrated cost matrix (D) is obtained by the following equation.

$$d_{n,m} = c_{n,m} + \min \begin{cases} d_{(n-2),(m-1)} + c_{(n-1),m} \\ d_{(n-1),(m-2)} + c_{n,(m-1)} \\ d_{(n-1),(m-1)} \end{cases} \quad \text{(Equation 3)}$$

for $n \in [1:N]$ and $m \in [1:M]$

Here, the following elements are given initial values: $d_{-1,-1}=\infty$ $d_{n,-1}=\infty$ for $n \in [0:N]$ $d_{-1,m}=\infty$ for $m \in [0:M]$ $d_{0,0}=0$ $d_{n,0}=\infty$ for $n \in [1:N]$ $d_{0,m}=\infty$ for $m \in [1:M]$ $d_{1,1}=c_{1,1}$. The integrated cost matrix is extended to $(N+2) \times (M+2)$ matrix. At this time, the determination method of the optimal warping path (P) from the integrated cost matrix (D) is modified, and $p(l-1)$ for $pl$ is determined by the following equation.

$$p_{l-1} = \begin{cases} (n_l - 1), m_l) & \text{if } \begin{array}{l} d_{n_l, m_l} = d_{(n_l-2),(m_l-1)} + \\ c_{(n_l-1), m_l} + c_{n_l, m_l} \end{array} \\ (n_l, (m_l - 1)) & \text{if } \begin{array}{l} d_{n_l, m_l} = d_{(n_l-1),(m_l-2)} + \\ c_{n_l,(m_l-1)} + c_{n_l, m_l} \end{array} \\ ((n_l - 1), (m_l - 1)) & \text{if } \begin{array}{l} d_{n_l, m_l} = d_{(n_l-1),(m_l-1)} + \\ c_{(n_l-1),(m_l-1)} + c_{n_l, m_l} \end{array} \end{cases}$$ [Equation 4]

Also, depending on the condition to be satisfied, at the same time as the determination of pl-1, pl-2 for pl is determined by the following equation.

$$p_{l-2} = \begin{cases} ((n_l - 2), (m_l - 1)) & \text{if } \begin{array}{l} d_{n_l, m_l} = d_{(n_l-2),(m_l-1)} + \\ c_{(n_l-1), m_l} + c_{n_l, m_l} \end{array} \\ ((n_l - 1), (m_l - 2)) & \text{if } \begin{array}{l} d_{n_l, m_l} = d_{(n_l-1),(m_l-2)} + \\ c_{n_l,(m_l-1)} + c_{n_l, m_l} \end{array} \end{cases}$$ [Equation 5]

Here, p1=(1, 1) is given as an initial condition, and pL=(N, M) as a boundary condition. By obtaining pl in the reverse order from pL, the optimal warping path (P) is determined.

Figure 14:
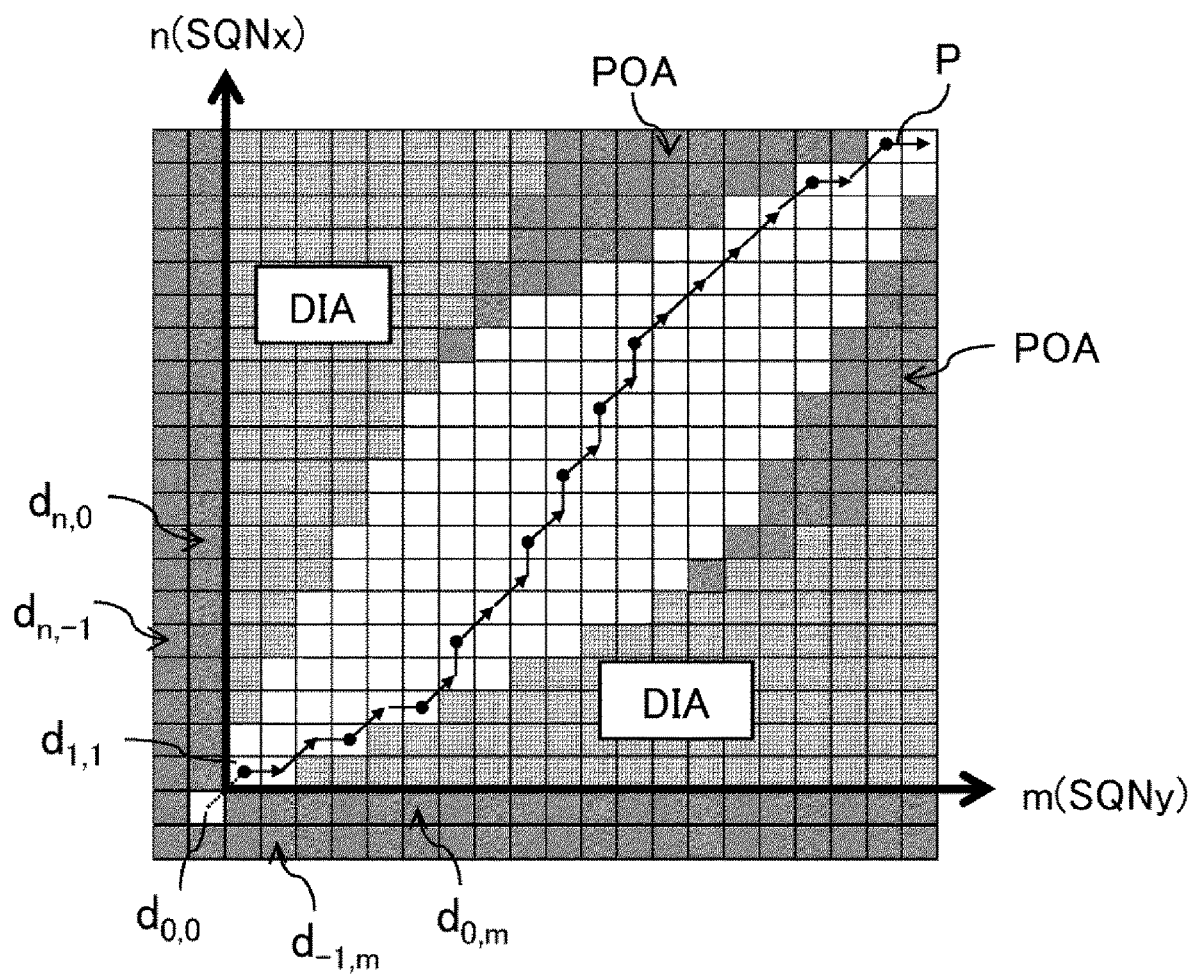
FIG. 14 is a diagram for explaining the integrated cost matrix (D) and the optimal warping path (P) of the DTW in which the step size condition is modified.

FIG. 14 is a diagram for explaining the integrated cost matrix (D) and the optimal warping path (P) of the DTW in which the step size condition is modified. In FIG. 14, the horizontal axis represents the discrete time (m) of the sequence y, and the vertical axis represents the discrete time (n) of the sequence x.

As shown in FIG. 14, in the DTW in which the step size constraint has been modified, the integrated cost matrix (D) is extended with respect to the naive DTW. That is, d0,m, d-1,m, dn,0, dn,-1 of extension elements for n=-1, 0 and m=-1, 0 of the virtual discrete time steps is added. As described above, d0,0 is 0, and dn,m of other extension elements is ∞ as the initial condition.

At this time, the integrated cost matrix (D) is calculated based on the dynamic programming method, but the integrated cost of ∞ is propagated. The path with integrated costs of ∞ is not selected substantially as the time-step pl of the optimal warping path (P). This path is called "dn,m=∞" region (DIA). Also in the determination of the optimal warping path (P), there is an area in which the selection of the time warping step (pl) is limited by fixing the start point of the calculation by the initial condition. This area is referred to as a pl out-of-selection area. Thus, pl is subject to two selection restrictions by the DIA and the POA. Also, the limit range is not uniform for n and m of discrete time steps.

In particular, the discrete time steps of the start point (x1) of the sequence x and the start point (y1) of the sequence y are strongly limited by the boundary condition of the start warping step (p1) of the optimal warping path (P) about the time warping steps near p1. Similarly, the discrete time steps of the end point (xN) of the sequence x and the end point (yM) of the sequence y are strongly limited by the boundary condition of the end warping step (pL) of the optimal warping path (P) about the time warping steps near pL. The dark gray areas in FIG. 14 are POA, the light gray areas are DIA, and the white areas are where the time warping step pl is not limited.

The adjustment unit 32 can also set the down-sampling exclusion length (hereinafter, also referred to as Ls, Le) as a way of relaxing the selection limitation of the time warping step (pl). That is, the adjustment unit 32 has a function of excluding down-sampling from the start point and the end point of the composite sequence (CS) with respect to the number of Ls data points and the number of Le data points specified by the down-sampling exclusion length (Ls, Le). The first storage unit 31a stores a down-sampling factor (K) and a down-sampling exclusion length (Ls, Le).

Figure 15:
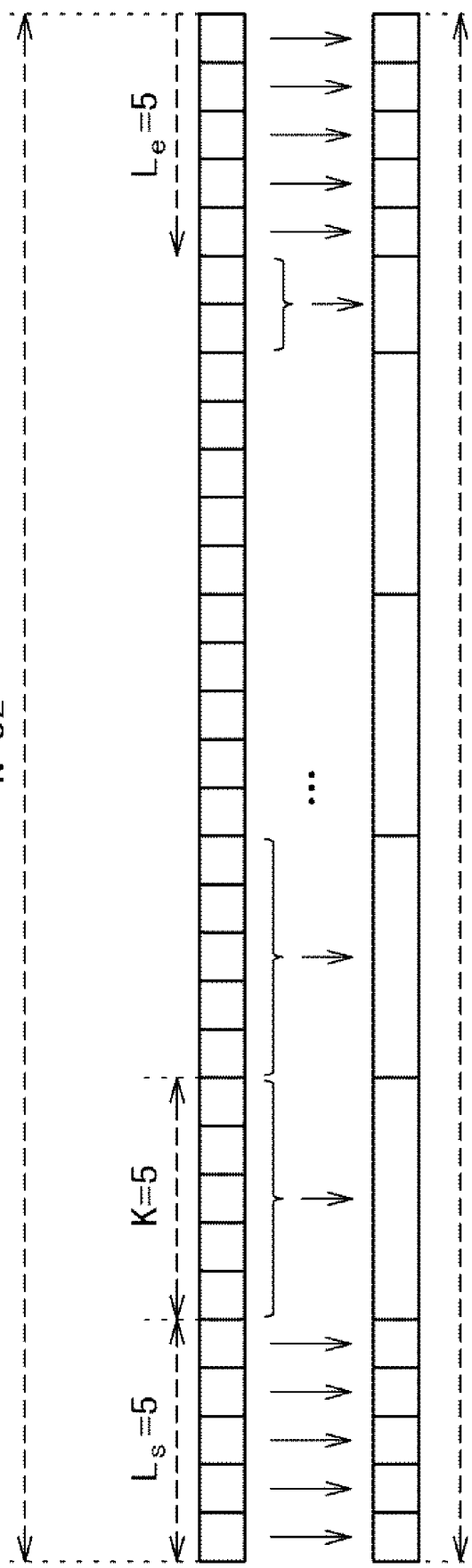
FIG. 15 is a diagram illustrating an outline of the sampling adjustment processing for the composite sequence.

Next, a sampling adjustment processing in the case where the above-described function of excluding the down-sampling is provided will be described with reference to FIG. 15. FIG. 15 is a diagram illustrating an outline of the sampling adjustment processing for the composite sequence.

As shown in FIG. 15, for example, the pre-adjustment sequence is expressed by the following equation.

$$x = (x_1, x_2, \ldots, x_{L_s}, x_{L_s+1}, \ldots, x_{N-L_e}, x_{N-L_e+1}, \ldots, x_N)$$ (Equation 6)

Here, N is the sequence length of the pre-adjustment sequence, and when N=32, Ls=5, Le=5 and K=5 are set as the sample adjustment condition. Then, down-sampling is not applied to the first and last five data points of the pre-adjusted sequence, and are stored as the first and last five data points of the post-adjusted sequence. On the other hand, for the 6th to 25th data points, down-sampling processing is performed every five data points. The 26th to 27th data points, the number of which data points is two less than K, are subjected to the same processing as the down-sampling processing for 5 data points, for example.

The adjusted sequence is represented by the following equation:

$$x' = (x_1, x_2, \ldots, x_{L_s}, x'_{L_s+1}, \ldots, x'_{N'-L_e}, x_{N'-L_e+1}, \ldots, x_{N'})$$

Here, N' is the sequence length of the adjusted sequence, as shown in FIG. 15, i.e., N'=15, xn is the stored data point, and the x'n represents the new data point computed after the down-sampling processing.

Figure 16:
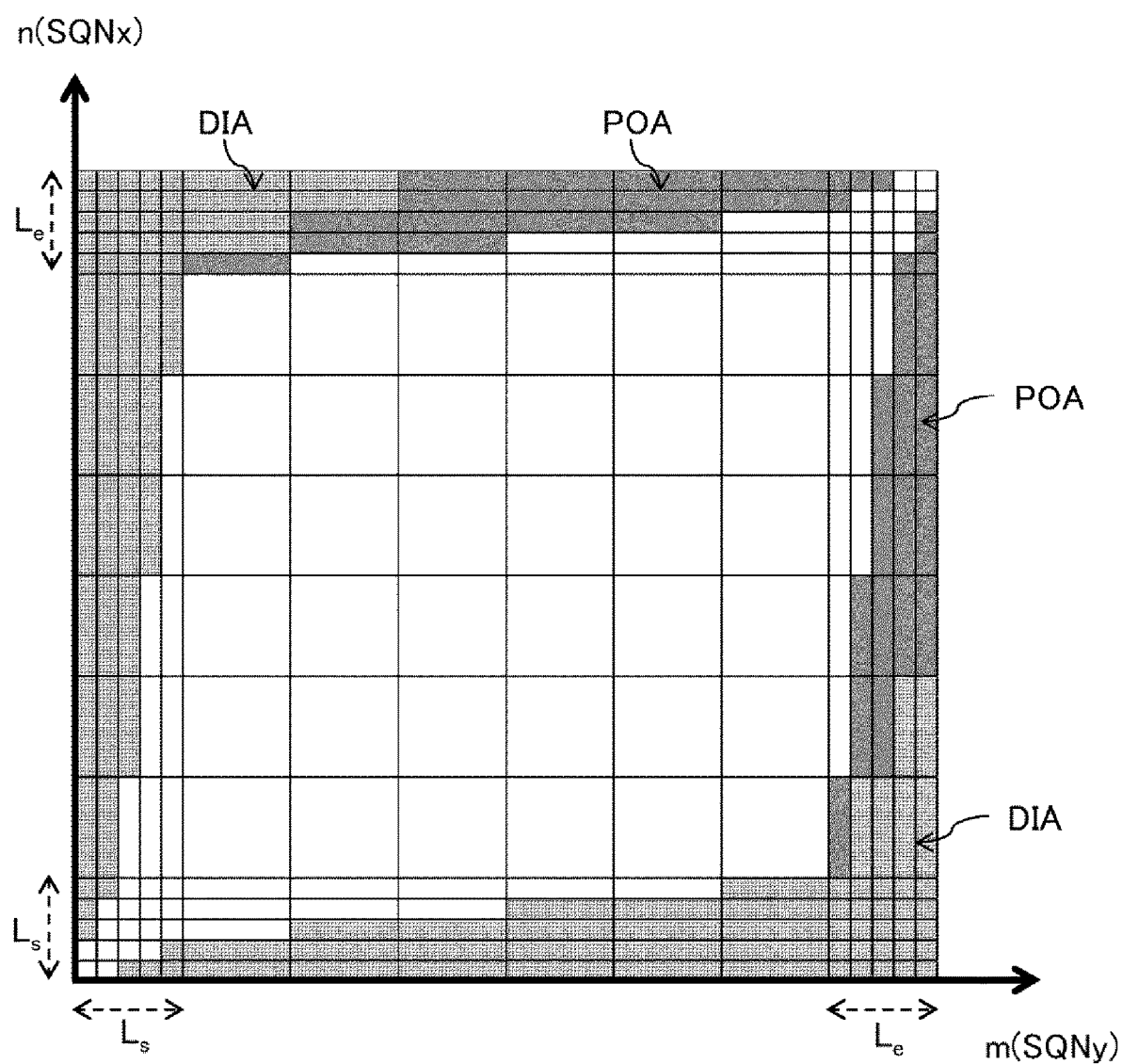
FIG. 16 is a diagram for explaining the relaxation of the selection limitation of time warping step pl by the sampling adjustment.

FIG. 16 is a diagram for explaining the relaxation of the selection limitation of pl by the sampling adjustment. In FIG. 16, the horizontal axis represents the discrete time (m) of the sequence y, and the vertical axis represents the discrete time (n) of the sequence x.

In the two sequences x and y, by performing matching between data points having different sampling times, it is possible to determine an optimal warping path in which the discrete time of one sequence is accelerated. The down-sampling factor (K) is set, and the down-sampling exclusion length (Ls, Le) is set. If the time step of either sequence is real sampling and the time step of the other sequence is down-sampled, an asymmetric time warping step (pl) can be obtained for the discrete time (n, m) of the real sampling. This can increase the selection flexibility of the time warping step (pl) in the discrete time step (n, m) in which both sequences are down-sampled. The dark gray areas in FIG. 16 are POA, the light gray areas are DIA, and the white areas are where the time warping step pl is not limited. FIG. 16 shows a wider (pl) region, which is a white area where the time warping step is not limited, compared to FIG. 14.

The first embodiment or modified example has at least one of the following effects. (1) By applying DTW, which is a matching method of two sequences, it is possible to extract a specific subsequence from a composite sequence comprising a plurality of subsequences. (2) Since the anomaly detection focusing on a specific sub sequence can be performed, the anomaly detection accuracy can be improved, and the volume of anomaly detection reference parameters required for the anomaly detection processing can be reduced. This makes it possible to reduce memory resources and computational complexity. (3) The subsequence to be extracted can be intuitively specified by preparing the reference sequence and only determining the start and end points of the reference subsequence. This makes it possible to easily incorporate it as one of the operations of the production line because it does not depend on the skill of the technician who is the user and the work amount is constant. (4) The use of a down-sampling approach reduces the computational cost required and allows implementation in embedded systems. (5) By combining the DTW applied down-sampling with the DTW in the original sampling, the extraction of the highly accurate subsequence interval becomes possible. (6) By modifying the step size condition of the DTW, it is possible to appropriately determine the extraction interval of the subsequence even when an anomaly appears as amplitude variation in the subsequence interval. (7) By adjusting the interval applied down-sampling, it is possible to alleviate the factor of the accuracy reduction of the subsequence interval extraction with the modification of the step size condition of DTW.

Figure 17:
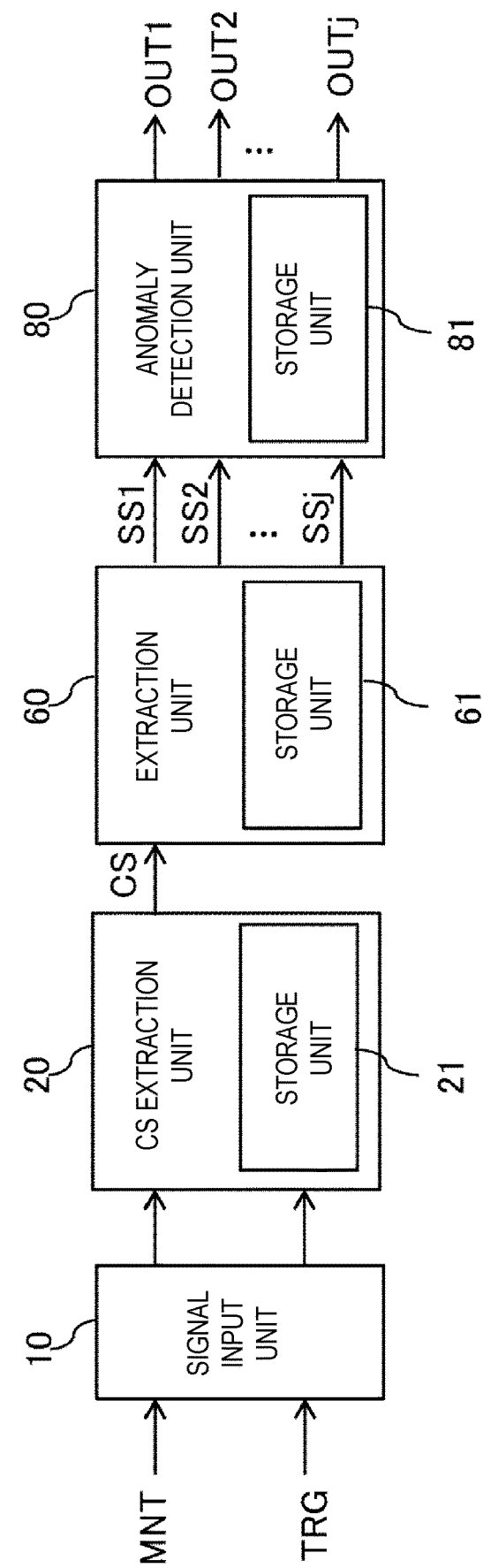
FIG. 17 is a block diagram illustrating the configuration of the anomaly detection system of the second embodiment.

A second embodiment of anomaly detection systems will be described with reference to FIG. 17. FIG. 17 is a block diagram illustrating the configuration of the anomaly detection system of the second embodiment.

In the anomaly detection system 2 of the second embodiment, the extraction unit 30 and the anomaly detection unit 40 in the first embodiment are replaced with the extraction unit 60 and the anomaly detection unit 80, respectively. The rest of the configuration of the anomaly detection system 2 is the same as that of the anomaly detection system 1. The extraction unit 60 and the anomaly detection unit 80 comprise a storage unit 61 and a storage unit 62, respectively.

The extraction unit 60 extracts a plurality of subsequences (SS) from the composite sequence (CS) input from the CS extraction unit 20 based on each extraction condition, and transmits the subsequences (SS) to the anomaly detection unit 80. The storage unit 61 stores a plurality of extraction conditions.

The anomaly detection unit 80 performs anomaly detection for each subsequence (SS) based on a plurality of anomaly detection conditions for each subsequence (SS) for a plurality of input subsequences (SS1, SS2, . . . , SSj). The anomaly detection unit 80 outputs output signals (OUT1, OUT2, . . . , OUTj) such as a plurality of anomaly detection results. The storage unit 81 stores a plurality of anomaly detection conditions.

Figure 18:
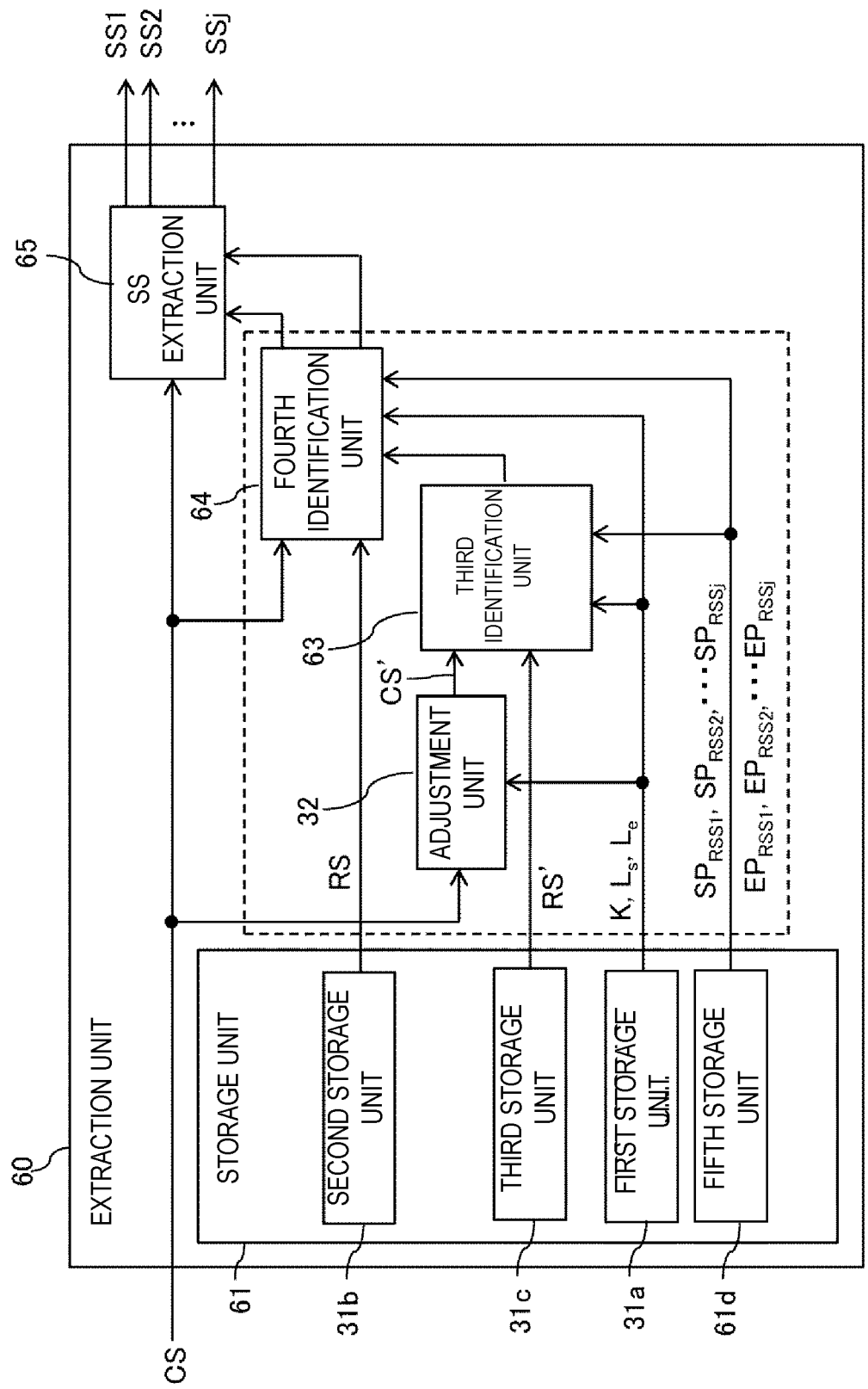
FIG. 18 is a block diagram illustrating the configurations of the extraction unit 60 and the storage unit 61 of FIG. 17.

Next, the extraction unit 60 will be described with reference to FIG. 18. FIG. 18 is a block diagram illustrating the configurations of the extraction unit 60 and the storage unit 61 of FIG. 17.

As shown in FIG. 18, the extraction unit 60 is configured by replacing the fourth storage unit 31d of the storage unit 31 in the first embodiment with the fifth storage unit 61d of the storage unit 61. The extraction unit 60 is configured by replacing the first identification unit 33, the second identification unit 34, and the SS extraction unit 35 in the first embodiment with the third identification unit 63, the fourth identification unit 64, and the SS extraction unit 65, respectively. The other configuration of the extraction unit 60 is the same as that of the extraction unit 30, and the other configuration of the storage unit 61 is the same as that of the storage unit 31.

The fifth storage unit 61d stores a group of start points (SPRSS1, SPRSS2, . . . , SPRSSj) and a group of an end points (EPRSS1, EPRSS2, . . . , EPRSSj) of a plurality of subsequence segments to be extracted on the reference sequence.

The third identification unit 63 and the fourth identification unit 64 identify the start point and the end point of each of the plurality of subsequence sections SSI by the same processing as the first identification unit 33 and the second identification unit 34 of the first embodiment. By referring to the start point and the end point of each of the plurality of reference subsequence sections RSSI, the start point and the end point of each of the plurality of subsequences can be identified in parallel.

The SS extraction unit 65 extracts a plurality of subsequences from the composite sequence based on the start point and the end point of each of the plurality of reference subsequence sections obtained by the fourth identification unit 64, and outputs the extracted subsequences to the anomaly detection unit 80.

Figure 19:
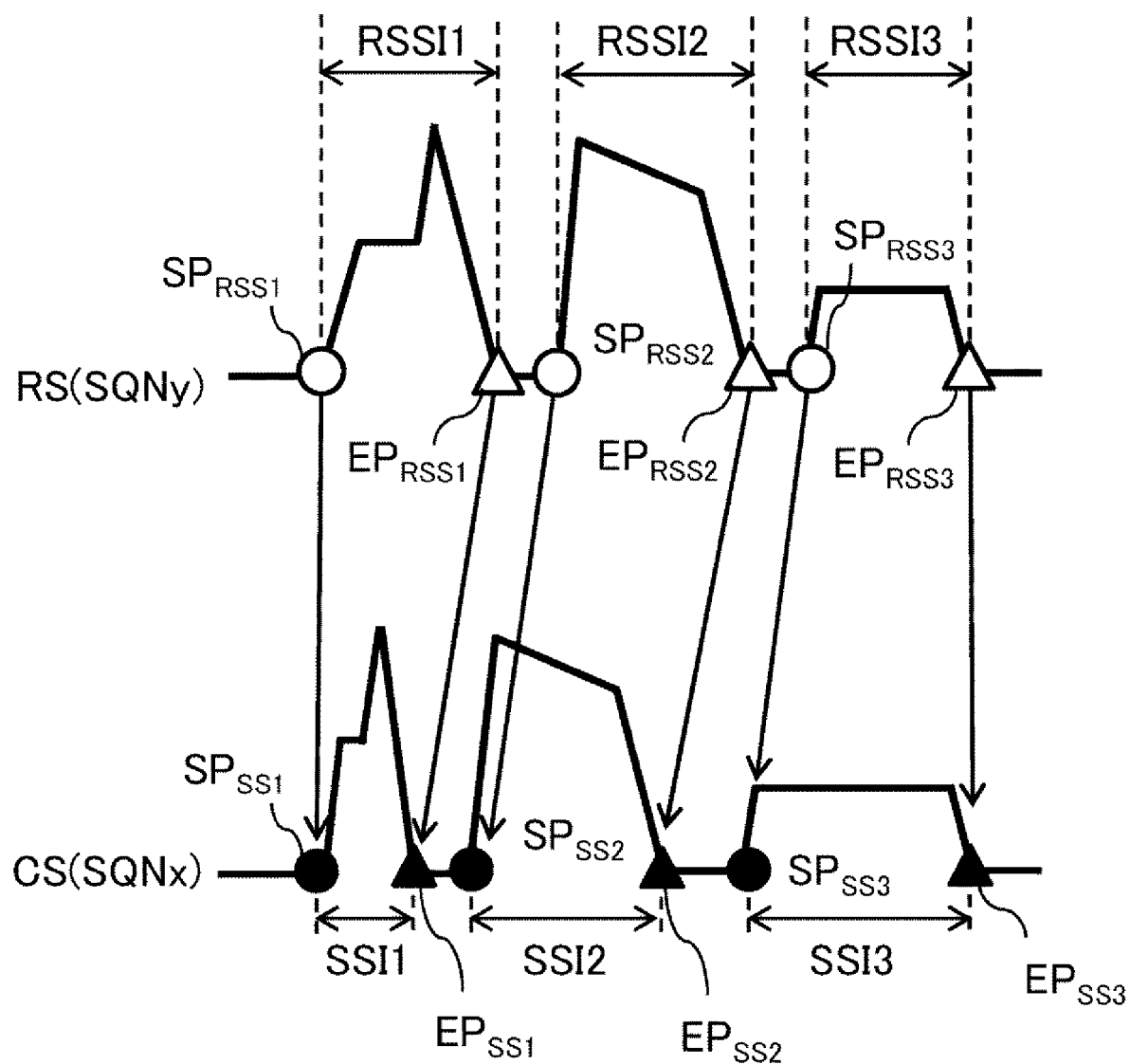
FIG. 19 is a diagram illustrating the relationship between the reference sequence and the composite sequence handled by the anomaly detection system of FIG. 17.
Figure 20:
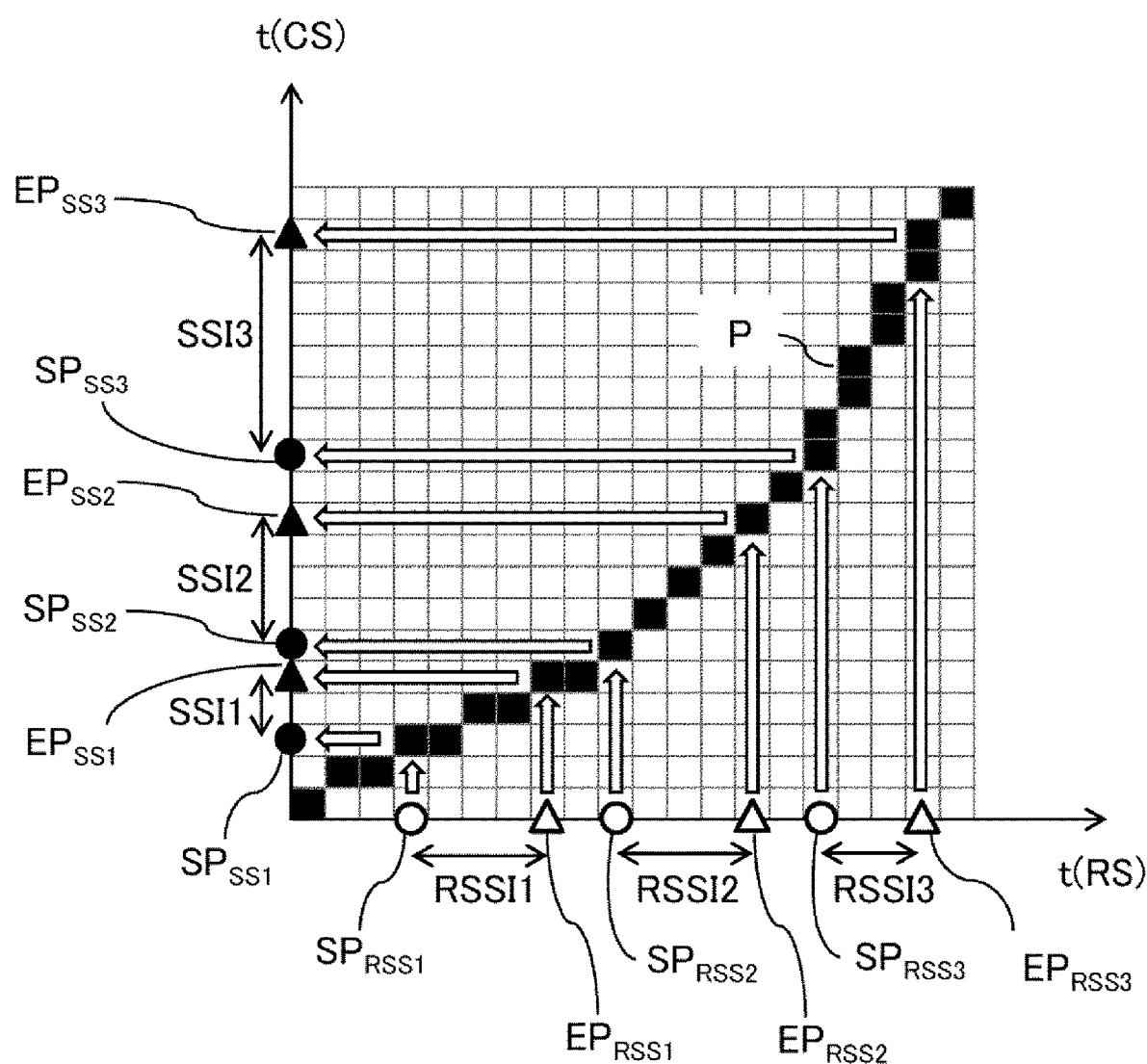
FIG. 20 is a diagram illustrating a concept in which the extraction unit 60 of FIG. 17 extracts a subsequence of a composite sequence from a reference sequence.

Specific examples of a start point and an end point of a plurality of subsequence sections will be described with reference to FIGS. 19 and 20. FIG. 19 is a diagram illustrating the relationship between the reference sequence and the composite sequence. FIG. 20 is a diagram illustrating a concept of extracting a subsequence of a composite sequence from a reference sequence.

First, as shown in FIG. 19, each of the referenced subsequence sections is defined as RSSI1, RSSI2, RSSI3. The start point (SPRSS1, SPRSS2, SPRSS3) and end point (EPRSS1, EPRSS2, SPRSS3) of each referenced subsequence interval are specified.

Next, as shown in FIG. 20, the extraction unit 60 performs DTW-based processing on the two sequences of the reference sequence and the composite sequence, and determines an optimal warping path (P) as a first optimal warping path.

Finally, the extraction unit 60 refers to the determined optimal warping path (P) and obtains data points on the composite sequence corresponding to the start point (SPSS1) and the end point (EPSS1) of the reference subsequence section (RSSI1). In addition, the extraction unit 60 refers to the determined optimal warping path (P) and obtains data points on the composite sequence corresponding to the start point (SPSS2) and the end point (SPSS2) of the reference subsequence section (RSSI2). Further, the extraction unit 60 refers to the determined optimal warping path (P) and obtains data points on the composite sequence corresponding to the start point (SPSS3) and the end point (EPSS3) of the reference subsequence section (RSSI3). This makes it possible to identify SSI1, SSI2, SSI3 of a plurality of subsequences to be extracted on the composite sequence.

The second embodiment has at least one of the following effects. (1) Anomaly detection can be performed on a plurality of subsequences on a composite sequence. (2) The third identification unit 63 is configured in that the calculation cost of the optimal warping path calculation of the DTW, which occupies the calculation amount in particular, is independent of the number of subsequences to be extracted, and makes it possible to suppress an increase in the calculation cost due to an increase of the subsequences to be extracted.

Figure 21:
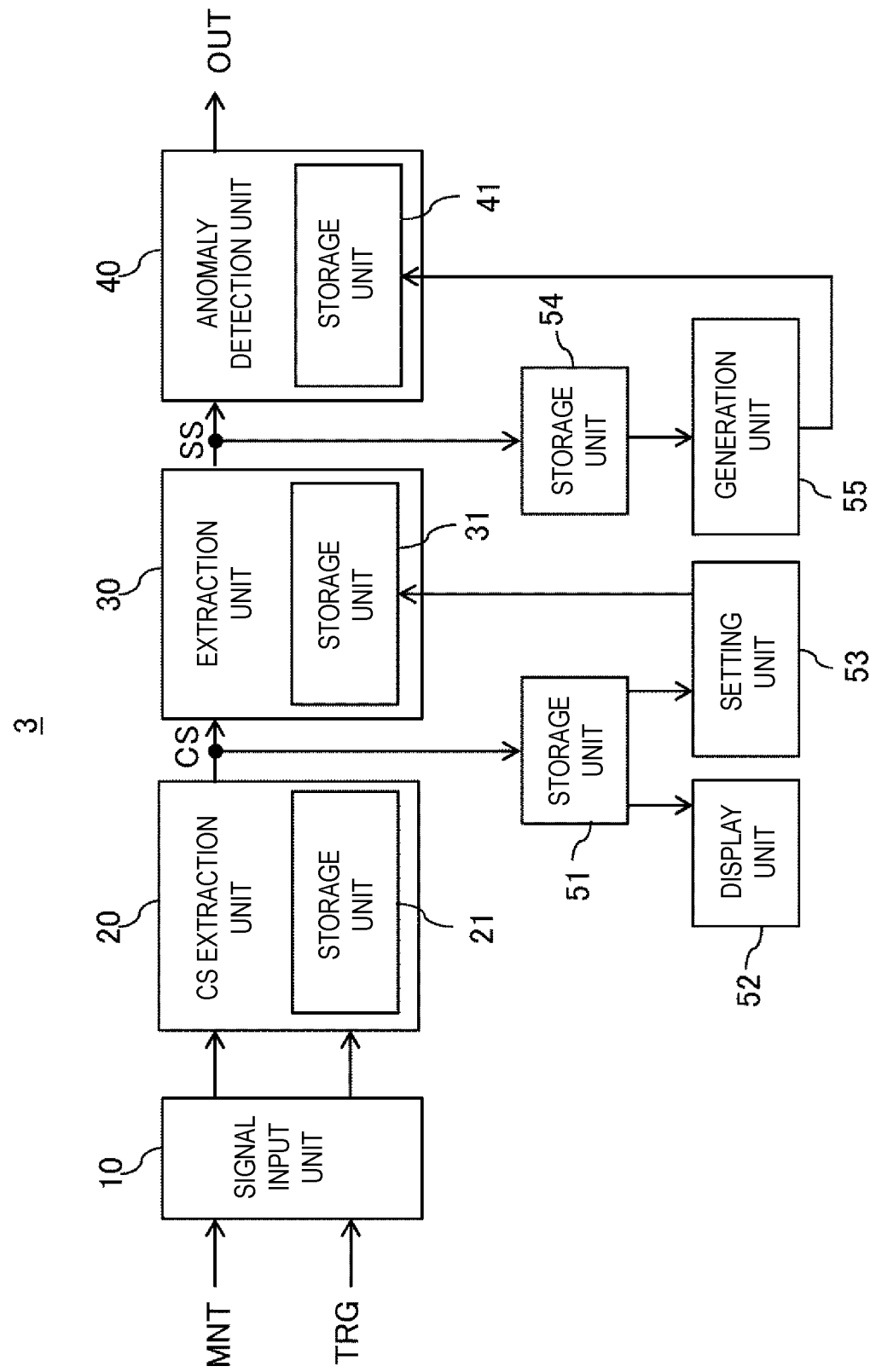
FIG. 21 is a block diagram illustrating the configuration of the anomaly detection system in the third embodiment.

A third embodiment of anomaly detection system will be described with reference to FIG. 21. FIG. 21 is a block diagram illustrating the configuration of the anomaly detection system in the third embodiment.

The anomaly detection system 3 of the third embodiment sets and generates an extraction condition and an anomaly detection condition stored in the storage unit 31 and the storage unit 41 in the first embodiment, respectively. The anomaly detection system 3 further includes a storage unit 51, a display unit 52, a setting unit 53, a storage unit 54, and a generation unit 55 against the anomaly detection system 1.

The storage unit 51 stores a plurality of composite sequences extracted by the CS extraction unit 20. The display unit 52 displays a plurality of composite sequences stored in the storage unit 51 on a display (not shown) by time-series waveform display software. The setting unit 53 sets a subsequence extraction condition to be input by the user to the storage unit 31 through an input interface such as a GUI (not shown).

After confirming a plurality of composite sequences displayed on the display unit 52, the user selects one composite sequence to be used as a reference sequence, and specifies a start point and an end point of the reference subsequence. As a sampling adjustment condition, a down-sampling factor (K) and a down-sampling exclusion length (Ls, Le) are specified.

The setting unit 53 stores the start point and end point of the reference sequence selected by the user, the start point and end point of the reference subsequence, and the sampling adjustment condition in the storage unit 31. In addition, the setting unit 53 performs the down-sampling set by the down-sampling adjustment condition specified by the user on the reference sequence, and stores the down-sampled reference sequence as the DS reference sequence RS' in the storage unit 31.

The storage unit 54 collects and stores the subsequences extracted according to the set subsequence extraction conditions. The generation unit 55 generates an anomaly detection condition using a plurality of subsequences stored in the storage unit 54, and stores the condition in the storage unit 41. The method of generating the anomaly detection condition in the generation unit 55 differs depending on the algorithm employed in the anomaly detecting unit 40. For example, in the case of anomaly detection by a neural network, a weight parameter constituting the neural network is set as an anomaly detection condition. As a result, it is possible to generate an anomaly detection condition by the error back propagation method, which is the weighting parameter update method of the neural network.

The third embodiment has the following effects. By using the configuration of the anomaly detection system 1 of the first embodiment as it is, various conditions in the anomaly detection system can be set step by step.

Figure 22:
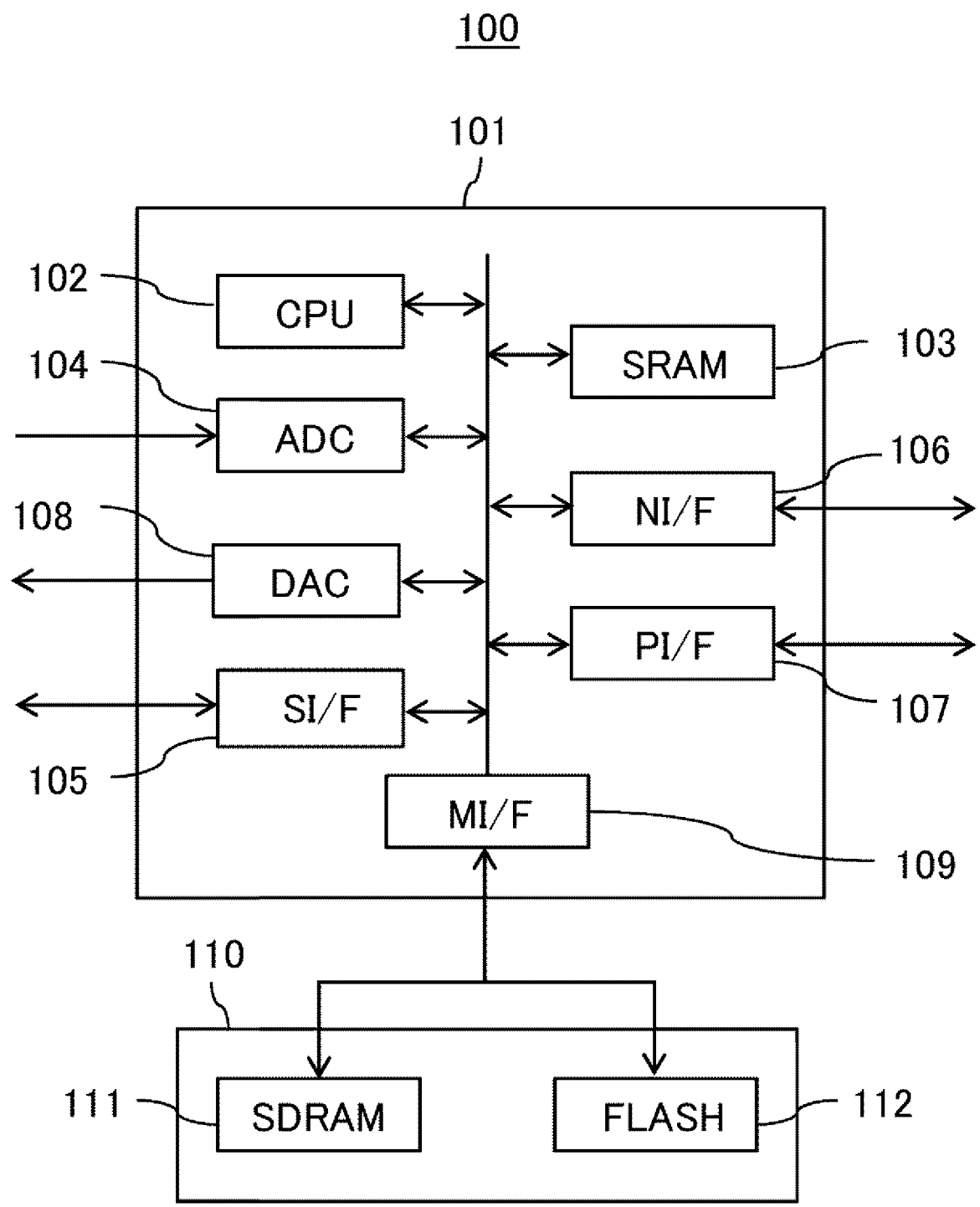
FIG. 22 is a block diagram illustrating the configuration of the anomaly detection apparatus in the fourth embodiment.

Next, an example of constructing the anomaly detection systems of the first embodiment, the second embodiment, and the third embodiment, using a semiconductor device, i.e., anomaly detection apparatus, will be described with reference to FIG. 22. FIG. 22 is a block diagram illustrating the configuration of the anomaly detection apparatus.

A fourth embodiment of anomaly detection apparatus 100 comprises a microcomputer including a semiconductor device 101 and a semiconductor memory device 110. The semiconductor device 101 includes a central processing unit (CPU) 102, a static random access memory (SRAM) 103, and an analog-to-digital conversion circuit (ADC) 104. The semiconductor device 101 further includes a serial data interface (SI/F) 105, a network interface (NI/F) 106, and a parallel data interface (PI/F) 107. The semiconductor device 101 further includes a digital-to-analog converter (DAC) 108 and a memory interface (MI/F) 109. The semiconductor device 101 is formed in one semiconductor chip, for example, but may be formed in a plurality of semiconductor chips. The device 110 includes a synchronous dynamic random access memory (SDRAM) 111 and a flash memory (FLASH) 112.

The signal input unit 10 of FIGS. 7, 17 and 21 may be implemented by programming with dedicated circuits or CPU102, or combinations thereof. Dedicated circuits are ADC104 or SI/F105 or NI/F106. SI/F105 is, for example, a RS232C interface. NI/F106 is, for example, an interface of a local area network. The CS extraction unit 20, the extraction units 30 and 60, the display unit 52, the setting unit 53, the generation unit 55, and the anomaly detecting units 40 and 80 are mainly implemented by a programming processing using a CPU102. The programs are stored in a FLASH112 or the like.

The storage units 21, 31, 41, 51, 54, 61, and 81 are configured by a storage device. The storage device includes SRAM103, SDRAM111 or FLASH112 or combinations thereof. Instead of the flash memory 112, another non-volatile memory or a hard disk drive, i.e., HDD, may be used.

The output signals output from the anomaly detection units 40 and 80, e.g., OUT, OUT1, . . . , OUTj, turn on the LEDs by DAC108. Alternatively, the output signals, e.g., OUT, OUT1, . . . , OUTj, notify other systems of the result of the anomaly detection processing or the calculated result of the processing process by NI/F106.

However, the implementation mode of each part is not necessarily limited to this, and may be hardware, software, or a combination of hardware and software.

In the fourth embodiment of the anomaly detection apparatus 100, the anomaly detection systems 1, 2, and 3 shown in FIGS. 7, 17, and 21 are mounted on one microcomputer. However, in the anomaly detection systems 1, 2, and 3, it is possible to separate the anomaly detection unit 40 or the anomaly detection unit 80 and mount it on a component different from the microcomputer, such as another microcomputer including another CPU. The signal input unit 10, the CS extraction unit 20, and the extraction unit 30 (or the extraction unit 60) may be provided in the semiconductor manufacturing device which is the detection target device.

The anomaly detection systems 1, 2, and 3 may be provided, for example, in a one-to-one relationship with the semiconductor manufacturing device, or in a relationship of one to a plurality of semiconductor manufacturing device. When provided on a one-to-one basis for a semiconductor manufacturing device, the anomaly detection systems 1, 2, 3 may be mounted, for example, in a semiconductor manufacturing device or as external components of a semiconductor manufacturing device. The semiconductor manufacturing device is, for example, a thin film forming device such as CVD device, a dry etching device such as reactive ion etching, or the like.

As described above, the monitor signal MNT is, for example, a signal indicating the processing status of the semiconductor manufacturing device, and is a sensor signal from various sensors provided in the semiconductor manufacturing device or added to the semiconductor manufacturing device. The various sensors are, for example, a flow rate sensor for monitoring the flow rate of the gas, and a pressure sensor for monitoring the pressure of the chamber. The various sensors may include a power sensor for monitoring the RF power of the plasma, an EPD (End Point Detector) for monitoring the progress of the plasma etching, and the like.

In the present disclosure, as an example of the anomaly detection system, the anomaly detection system of the semiconductor manufacturing device is described. However, the present invention is not necessarily limited thereto, and the anomaly detection system of the present disclosure can be applied to a system for detecting an anomaly of a device or a machine that produces a product, for example, a chemical device, a machine tool, a food machine, or the like.

The anomaly detection system of the present disclosure detects an anomaly in the manufacturing process of the manufacturing device from the time-series electrical signal, but the nature of the original signal is not limited to as long as the anomaly can be converted into the time-series electrical signal by the sensor. Light, electromagnetic waves, heat, acceleration, vibration, sound, or the like may be used as well as current and voltage.

Although the present disclosure has been specifically described based on the embodiments, embodiment, and modified example, the present disclosure is not limited to the above-described embodiments, embodiment, and modified example, and it is needless to say that various modifications can be made.

What is claimed is:

1. An anomaly detection system for detecting an anomaly of a manufacturing device, the anomaly detection system comprising:
   a central processing unit (CPU) configured to:
   receive, from a sensor for measuring an operational parameter of the manufacturing device, the operational parameter as an analog monitor signal;
   convert the analog monitor signal into a digital monitor signal comprising a composite sequence that is a series of sequences and includes a plurality of subsequences and indicating a status of the manufacturing device;
   extract a specific subsequence of the manufacturing device from the plurality of subsequences of the composite sequence included in the digital monitor signal,
   determine a first optimal warping path by a dynamic time warping method from the composite sequence and a reference sequence that is an example of a composite sequence acquired in advance;
   identify start and end points of the specific subsequence based on the first optimal warping path, and start and end points of a subsequence of the reference sequence acquired in advance;
   extract the specific subsequence based on the start and end points of the specific subsequence;
   adjust a sampling interval of the composite sequence by a process of extracting or complementing an average value, a maximum value, a minimum value or a median value of adjacent data points, a number of which data points is specified by a down-sampling factor;
   determine a second optimal warping path by a dynamic time warping method from the composite sequence of the adjusted sampling interval, and a reference sequence that is acquired in advance and is adjusted a sampling interval by a process of extracting or complementing an average value, a maximum value, a minimum value or a median value of adjacent data points, a number of which data points is specified by a down-sampling factor;
   identify start and end areas of the specific subsequence based on the second optimal warping path, and start and end points of a subsequence of the reference sequence acquired in advance;
   identify start and end points of the specific subsequence based on the second optimal warping path, and the start and end areas of the subsequence of the composite sequence;
   identify start and end areas of the subsequence of the reference sequence based on the second optimal warping path, and the start and end areas of the subsequence of the composite sequence;
   identify the start point of the specific subsequence based on a third optimal warping path for two sequences of the start area of the subsequence of the reference sequence and the composite sequence, and the start point of the subsequence of the reference sequence; and
   identify the end point of the specific subsequence based on the third optimal warping path for two sequences of the end area of the subsequence of the reference sequence and the composite sequence, and the end point of the subsequence of the reference sequence; and
   exclude down-sampling for a number of data points starting from a start point and an end point of the composite sequence, the number of data points being specified by a down-sampling exclusion length,
   wherein the CPU, based on the extracted specific subsequence, outputs an output signal or indicates the status of the manufacturing device.

2. The anomaly detection system according to claim 1, wherein a dynamic time warping method that determines any or a combination of the first to third optimal warping path modifies a step size constraint.

3. The anomaly detection system according to claim 1, wherein the CPU is configured to extract a subsequence different from the specific subsequence among the plurality of sub-sequences based on the first optimal warping path, and start and end points of a subsequence different from the subsequence of the reference sequence acquired in advance.

4. The anomaly detection system according to claim 1, wherein the CPU is further configured to extract the digital monitor signal comprising a time interval indicated by a trigger signal as the composite sequence having a finite width.

5. The anomaly detection system according to claim 4, wherein the CPU is further configured output the digital monitor signal and the trigger signal as a time-series digital signal.

6. The anomaly detection system according to claim 1, wherein the CPU is further configured to perform anomaly detection processing on the extracted specific subsequence based on an anomaly detection condition.

7. The anomaly detection system according to claim 4, wherein the anomaly detection system further comprises a first memory configured to store a plurality of composite sequences extracted by the CPU,
   wherein the CPU is further configured to control a display configured to display the plurality of composite sequences stored in the first memory,
   wherein the CPU is further configured to set a subsequence extraction condition,
   wherein the anomaly detection system further comprises a second memory configured to store a plurality of subsequences extracted by the set subsequence extraction condition, and
   wherein the CPU is further configured to generate an anomaly detection condition based on the plurality of sub-sequences extracted.

8. An anomaly detection apparatus for detecting an anomaly of a manufacturing device, the anomaly detection apparatus comprising:
   a central processing unit; and
   a memory,
   wherein the central processing unit is configured to:
   receive, from a sensor for measuring an operational parameter of the manufacturing device, the operational parameter as an analog monitor signal;
   convert the analog monitor signal into a digital monitor signal comprising a composite sequence that is a series of sequences and includes a plurality of subsequences and indicating a status of the manufacturing device;
determine a first optimal warping path by a dynamic time warping method from the composite sequence and a reference sequence that is an example of a composite sequence acquired in advance;
identify start and end points of a specific subsequence subject to anomaly detection among the plurality of subsequences based on the first optimal warping path, and start and end points of a subsequence of the reference sequence stored in the memory;
extract the specific subsequence based on the start and end points of the specific subsequence; and
perform anomaly detection processing on the extracted specific subsequence based on an anomaly detection condition,
wherein the central processing unit is configured to:
adjust a sampling interval of the composite sequence by a process of extracting or complementing an average value, a maximum value, a minimum value or a median value of adjacent data points, a number of which data points is specified by a down-sampling factor;
determine a second optimal warping path by a dynamic time warping method from the composite sequence of the adjusted sampling interval, and a reference sequence that is stored in the memory in advance and is adjusted a sampling interval by a process of extracting or complementing an average value, a maximum value, a minimum value or a median value of adjacent data points, a number of which data points is specified by a down-sampling factor;
identify start and end areas of the specific subsequence based on the second optimal warping path, and start and end points of a subsequence of the reference sequence stored the memory; and
identify start and end points of the specific subsequence based on the second optimal warping path, and the start and end areas of the subsequence of the composite sequence,
wherein the central processing unit is configured to:
identify start and end areas of the subsequence of the reference sequence based on the second optimal warping path, and the start and end areas of the subsequence of the composite sequence;
identify the start point of the specific subsequence based on a third optimal warping path for two sequences of the start area of the subsequence of the reference sequence and the composite sequence, and the start point of the subsequence of the reference sequence; and
identify the end point of the specific subsequence based on the third optimal warping path for two sequences of the end area of the subsequence of the reference sequence and the composite sequence, and the end point of the subsequence of the reference sequence,
wherein the central processing unit is configured to exclude down-sampling for a number of data points starting from a start point and an end point of the composite sequence, the number of data points being specified by a down-sampling exclusion length, and
wherein the central processing unit, based on the extracted specific subsequence, outputs an output signal or indicates the status of the manufacturing device.

9. The anomaly detection apparatus according to claim 8, wherein a dynamic time warping method that determines any or a combination of the first to third optimal warping path modifies a step size constraint.

10. An anomaly detection method for detecting an anomaly of a manufacturing device, the anomaly detection method comprising:
receive, from a sensor for measuring an operational parameter of the manufacturing device, the operational parameter as an analog monitor signal;
converting the analog monitor signal into a digital monitor signal comprising a composite sequence that is a series of sequences and includes a plurality of subsequences and indicating a status of the manufacturing device;
determining a first optimal warping path by a dynamic time warping method from the composite sequence and a reference sequence that is an example of a composite sequence acquired in advance;
identifying start and end points of a specific subsequence based on the first optimal warping path, and start and end points of a subsequence of the reference sequence acquired in advance;
extracting the specific subsequence based on the start and end points of the specific subsequence; and
performing anomaly detection processing on the extracted specific subsequence based on an anomaly detection condition,
wherein the anomaly detection method further comprising adjusting a sampling interval of the composite sequence by a process of extracting or complementing an average value, a maximum value, a minimum value or a median value of adjacent data points, a number of which data points is specified by a down-sampling factor,
wherein the determining comprises determining a second optimal warping path by a dynamic time warping method from the composite sequence of the adjusted sampling interval, and a reference sequence that is acquired in advance and is adjusted a sampling interval by a process of extracting or complementing an average value, a maximum value, a minimum value or a median value of adjacent data points, a number of which data points is specified by a down-sampling factor, and
wherein the identifying comprises:
identifying start and end areas of the specific subsequence based on the second optimal warping path, and start and end points of a subsequence of the reference sequence acquired in advance; and
identifying start and end points of the specific subsequence based on the second optimal warping path, and the start and end areas of the subsequence of the composite sequence,
wherein the identifying start and end points of the specific subsequence based on the second optimal warping path, and the start and end areas of the subsequence of the composite sequence comprises:
identifying start and end areas of the subsequence of the reference sequence based on the second optimal warping path, and the start and end areas of the subsequence of the composite sequence;
identifying the start point of the specific subsequence based on a third optimal warping path for two sequences of the start area of the subsequence of the reference sequence and the composite sequence, and the start point of the subsequence of the reference sequence; and identifying the end point of the specific subsequence based on the third optimal warping path for two sequences of the end area of the subsequence of the reference sequence and the composite sequence, and the end point of the subsequence of the reference sequence, wherein the adjusting comprises excluding down-sampling for a number of data points starting from a start point and an end point of the composite sequence, the number of data points being specified by a down-sampling exclusion length, and wherein the anomaly detection method further comprises outputting, based on the extracted specific subsequence, an output signal or indicating the status of the manufacturing device.

11. The anomaly detection method according to claim 10, wherein a dynamic time warping method that determines any or a combination of the first to third optimal warping path modifies a step size constraint.

\* \* \* \* \*